(12) United States Patent
Gengler

(10) Patent No.: US 9,227,763 B2
(45) Date of Patent: Jan. 5, 2016

(54) MULTI-FUNCTIONAL PROTECTIVE COVER FOR A COMPUTING ACCESSORY AND SUPPORT ACCESSORY FOR A PORTABLE ELECTRONIC DEVICE, AND METHODS AND SYSTEMS RELATING THERETO

(71) Applicant: ZAGG Intellectual Property Holding Co., Inc., Salt Lake City, UT (US)

(72) Inventor: David Gengler, Draper, UT (US)

(73) Assignee: ZAGG Intellectual Property Holding Co., Inc., Salt Lake City, UT (US)

( * ) Notice: Subject to any disclaimer, the term of this patent is extended or adjusted under 35 U.S.C. 154(b) by 325 days.

(21) Appl. No.: 13/673,833

(22) Filed: Nov. 9, 2012

(65) Prior Publication Data

US 2013/0114198 A1 May 9, 2013

Related U.S. Application Data

(60) Provisional application No. 61/557,738, filed on Nov. 9, 2011.

(51) Int. Cl.
*G06F 1/16* (2006.01)
*B65D 25/00* (2006.01)

(52) U.S. Cl.
CPC ........ *B65D 25/00* (2013.01); *G06F 1/16* (2013.01); *G06F 2200/1633* (2013.01); *Y10T 29/49826* (2015.01)

(58) Field of Classification Search
USPC .............. 361/679.08, 679.18–679.2, 679.55, 361/679.56, 679.59; 455/575.1, 575.8; 206/45.2
See application file for complete search history.

(56) References Cited

U.S. PATENT DOCUMENTS

| 949,904 | A | * | 2/1910 | King ......................... 206/45.2 |
| 1,599,492 | A | * | 9/1926 | Rothschild ................... 206/762 |
| 1,965,794 | A | * | 7/1934 | Davidson ..................... 206/45.2 |
| 3,195,850 | A | * | 7/1965 | Steiner ......................... 248/454 |
| 3,410,516 | A | * | 11/1968 | Criswell ....................... 248/459 |
| 5,607,054 | A | * | 3/1997 | Hollingsworth .............. 206/320 |
| 5,607,135 | A | * | 3/1997 | Yamada ........................ 248/456 |
| 6,082,696 | A | * | 7/2000 | Patterson ..................... 248/454 |
| 6,256,193 | B1 | * | 7/2001 | Janik et al. .............. 361/679.59 |
| 6,556,435 | B1 | * | 4/2003 | Helot et al. .............. 361/679.45 |
| 6,568,543 | B1 | * | 5/2003 | Schneider ...................... 211/43 |
| 6,903,927 | B2 | * | 6/2005 | Anlauff ..................... 361/679.28 |
| 6,967,836 | B2 | * | 11/2005 | Huang et al. ............. 361/679.46 |

(Continued)

OTHER PUBLICATIONS https://www.youtube.com/watch?v=HGGd83iqZYI (uploaded Nov. 11, 2011).*

*Primary Examiner* — Adrian S Wilson
(74) *Attorney, Agent, or Firm* — Durham Jones & Pinegar, P.C. Intellectual Property Law Group

(57) ABSTRACT

A computing system is provided with a portable electronic device, a computing accessory, and a multi-functional support accessory. The support accessory may provide a supportive configuration for supporting the portable electronic device in an upright, working position. The support accessory can also transition to a protective configuration for acting as a protective cover for the computing accessory. When the support accessory is in the protective configuration, the computing accessory can be inserted into, or otherwise protected thereby. When the support accessory is in the supportive position, the portable electronic device can be stabilized in an upright orientation by the support accessory.

24 Claims, 15 Drawing Sheets

(56) References Cited

U.S. PATENT DOCUMENTS

| | | | |
|---|---|---|---|
| 6,976,799 B2 * | 12/2005 | Kim et al. | 400/472 |
| 7,561,415 B2 * | 7/2009 | Liou et al. | 361/679.26 |
| 7,673,745 B2 * | 3/2010 | Sirichai et al. | 206/45.23 |
| 7,735,644 B2 * | 6/2010 | Sirichai et al. | 206/320 |
| 7,861,995 B2 * | 1/2011 | Liou | 248/454 |
| 8,077,151 B2 * | 12/2011 | Morooka | 345/168 |
| 8,100,376 B2 * | 1/2012 | Ye | 248/454 |
| 8,143,982 B1 * | 3/2012 | Lauder et al. | 335/219 |
| 8,230,992 B2 * | 7/2012 | Law et al. | 206/320 |
| 8,312,991 B2 * | 11/2012 | Diebel et al. | 206/45.24 |
| 8,359,078 B2 * | 1/2013 | Hung | 455/575.8 |
| D676,853 S * | 2/2013 | Gengler | D14/447 |
| 8,393,464 B2 * | 3/2013 | Yang et al. | 206/45.2 |
| 8,477,493 B2 * | 7/2013 | Wu et al. | 361/679.56 |
| 8,543,745 B2 * | 9/2013 | Minoo et al. | 710/73 |
| 8,567,740 B2 * | 10/2013 | Tarnutzer et al. | 248/456 |
| 8,599,542 B1 * | 12/2013 | Healey et al. | 361/679.17 |
| 8,608,119 B2 * | 12/2013 | Wolff et al. | 248/123.2 |
| 8,644,893 B2 * | 2/2014 | Liang | 455/575.1 |
| 8,766,921 B2 * | 7/2014 | Ballagas et al. | 345/168 |
| 8,800,763 B2 * | 8/2014 | Hale | 206/320 |
| 2005/0139740 A1 * | 6/2005 | Chen et al. | 248/286.1 |
| 2005/0231930 A1 | 10/2005 | Jao | |
| 2010/0048268 A1 * | 2/2010 | O'Neill et al. | 455/575.8 |
| 2010/0072334 A1 | 3/2010 | Le Gette et al. | |
| 2010/0090085 A1 * | 4/2010 | Corrion | 248/459 |
| 2010/0122924 A1 * | 5/2010 | Andrews | 206/320 |
| 2011/0031287 A1 | 2/2011 | Le Gette et al. | |
| 2011/0253850 A1 * | 10/2011 | Bau | 248/176.3 |
| 2011/0259788 A1 | 10/2011 | Zeliff et al. | |
| 2012/0099263 A1 | 4/2012 | Lin | |
| 2012/0125791 A1 * | 5/2012 | Parker et al. | 206/45.2 |
| 2012/0146466 A1 * | 6/2012 | Lu et al. | 312/223.1 |
| 2012/0170212 A1 | 7/2012 | Gallouzi et al. | |
| 2012/0181195 A1 * | 7/2012 | Lu et al. | 206/320 |
| 2012/0194448 A1 * | 8/2012 | Rothkopf | 345/173 |
| 2012/0199501 A1 | 8/2012 | Le Gette et al. | |
| 2012/0211377 A1 * | 8/2012 | Sajid | 206/216 |
| 2012/0217174 A1 * | 8/2012 | Ting | 206/45.2 |
| 2012/0325689 A1 * | 12/2012 | Wibby et al. | 206/45.2 |

\* cited by examiner

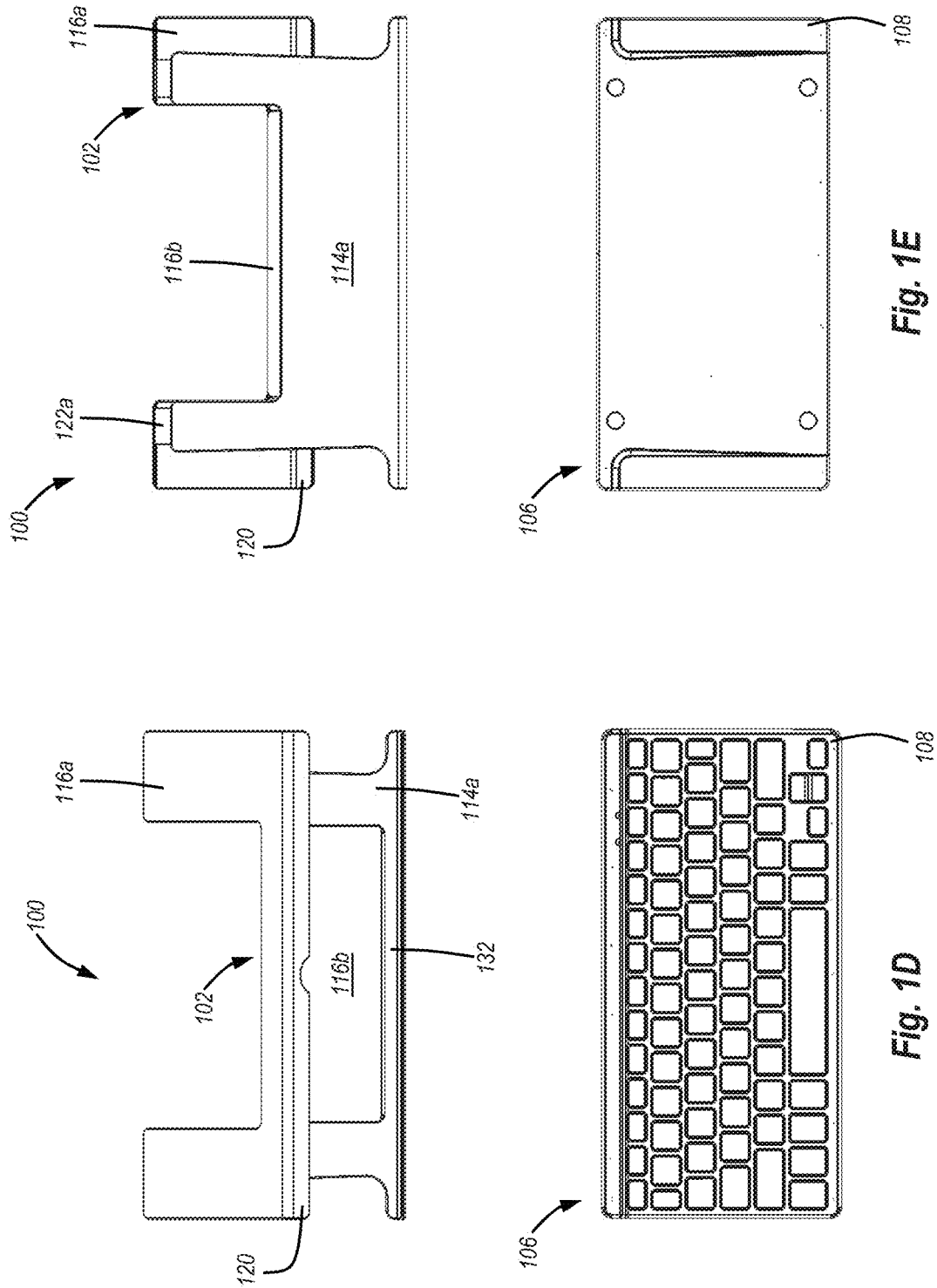

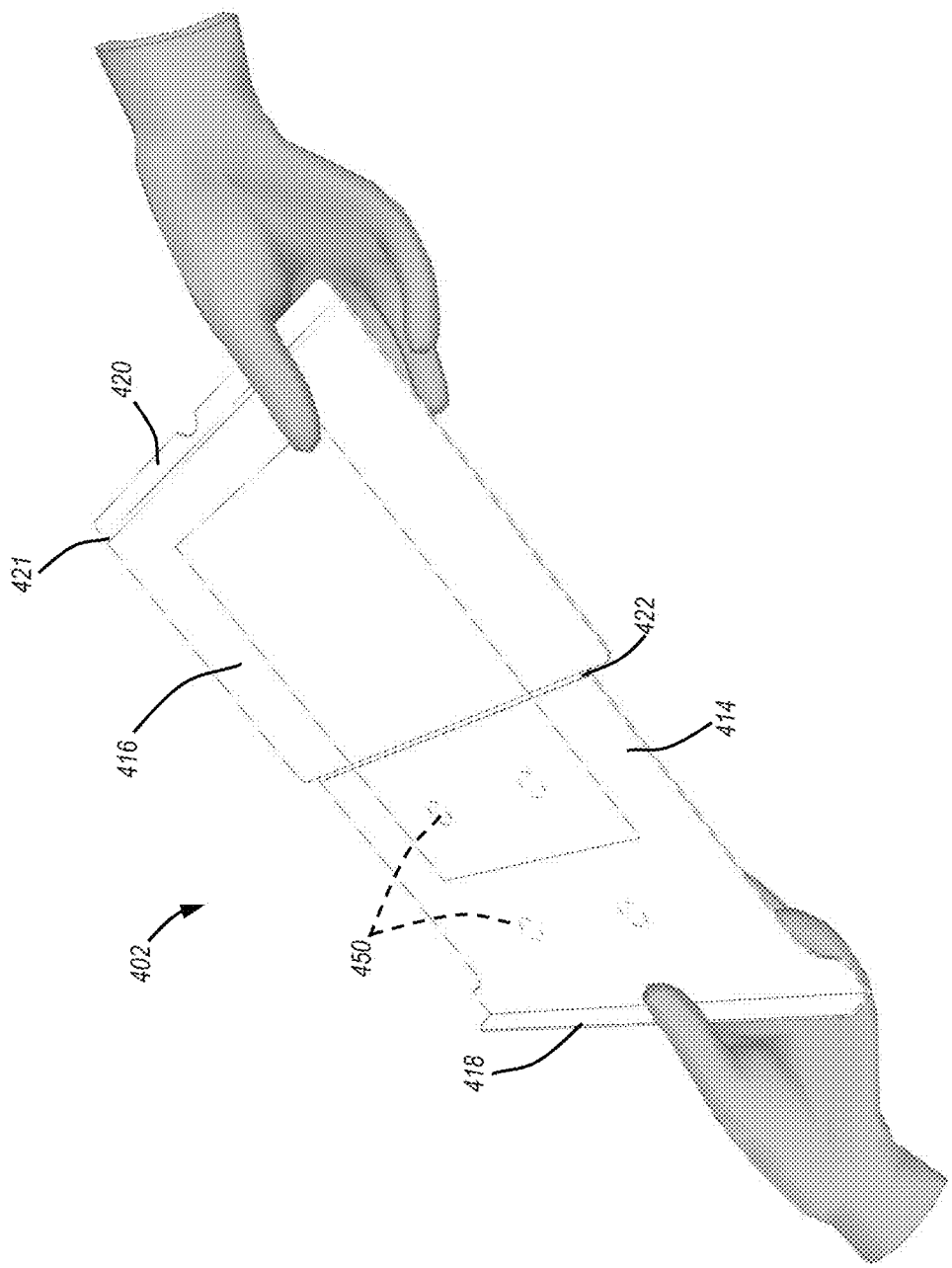

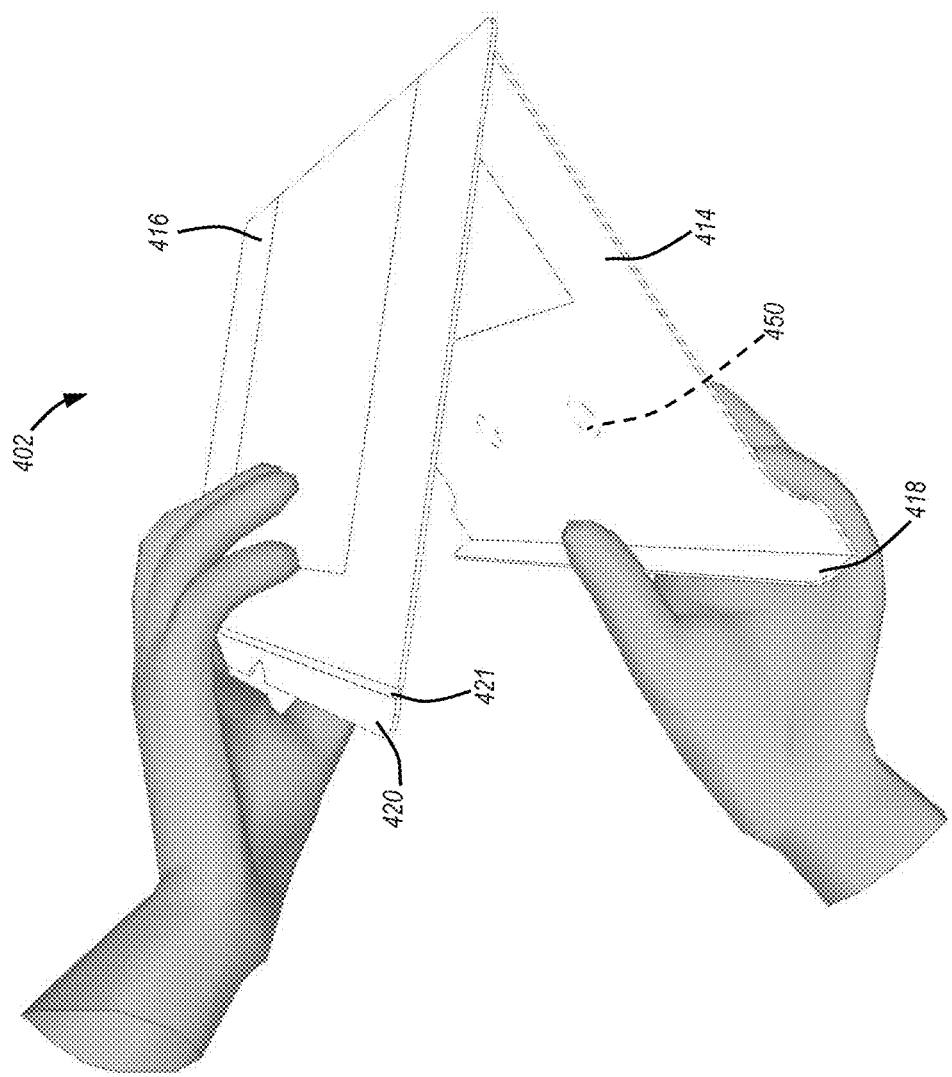

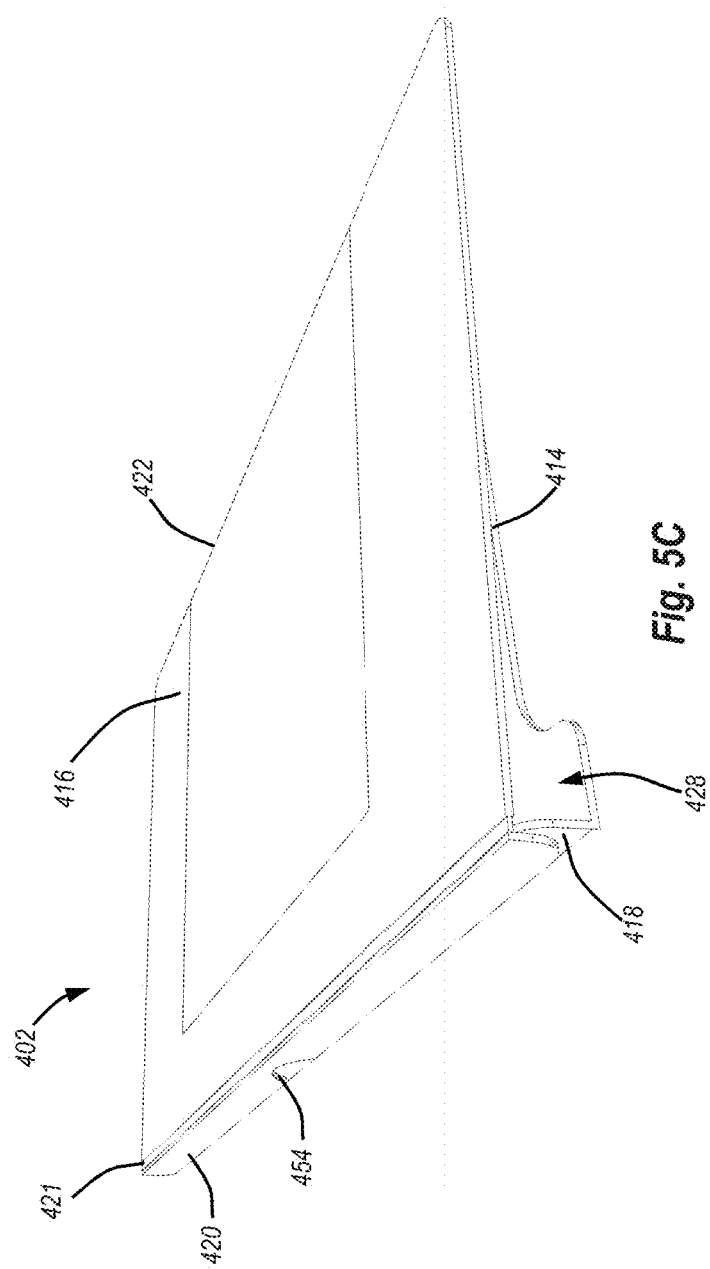

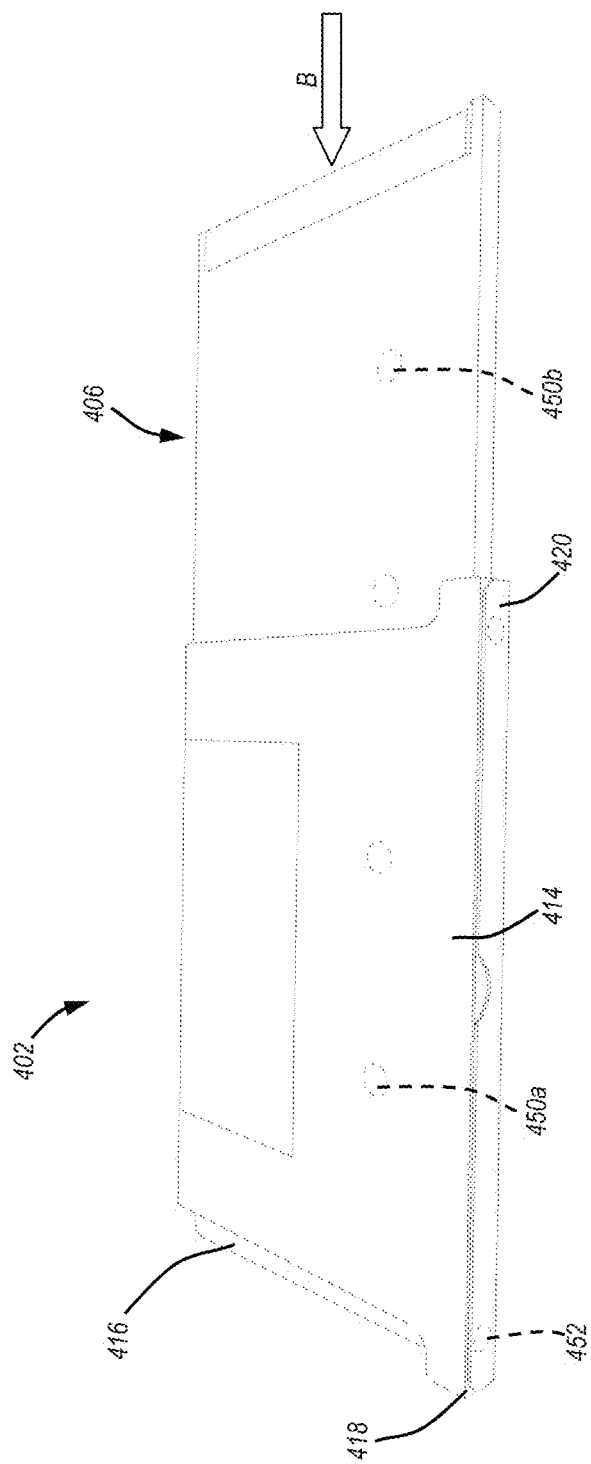

MULTI-FUNCTIONAL PROTECTIVE COVER FOR A COMPUTING ACCESSORY AND SUPPORT ACCESSORY FOR A PORTABLE ELECTRONIC DEVICE, AND METHODS AND SYSTEMS RELATING THERETO

CROSS-REFERENCE TO RELATED APPLICATIONS

This application claims the benefit of U.S. patent application Ser. No. 61/557,738, filed on Nov. 9, 2011 and titled "DUAL-USE PROTECTIVE COVER FOR A COMPUTING ACCESSORY AND SUPPORT ACCESSORY FOR A PORTABLE COMPUTING DEVICE", which application is hereby incorporated by this reference in its entirety.

TECHNICAL FIELD

The present disclosure relates generally to support accessories for portable electronic devices. A support accessory of the present disclosure may have multiple configurations and transitioning the support accessory between such configurations may be intuitive. In a supportive configuration, a support accessory may be usable to support or maintain a portable electronic device in an at least partially upright orientation. The present disclosure may further relate to covers for computing accessories or devices. In a protective configuration, a support accessory may cover or otherwise protect at least a portion of a computing accessory, such as a keyboard, to provide optional protection to the computing accessory.

RELATED ART

Since the advent of mobile computing, portable electronic devices have become increasingly portable, easier to use, and more affordable (at least from a cost-per-functionality perspective). As a result, the frequency with which portable electronic devices are used, and the circumstances and locations where they are used, are also ever-increasing. Users who have portable electronic devices will often access such devices many times throughout a day and in multiple locations. In fact, many people have multiple different portable electronic devices—such as smart phones, tablet devices, e-readers, etc.—and may use the various devices multiple times throughout the day.

The increased prevalence and portability of portable electronic devices has largely been made possible by advances in technology that allow processors, storage and memory devices, input/output devices and components, network communication devices, and other computing elements and systems to be more compact and powerful. Consequently, portable electronic devices are themselves becoming increasingly smaller and convenient—often with little or no reduction in computing power or computing capabilities.

To further reduce the size of some portable electronic devices, and thereby make the devices even more portable, touch-sensitive displays, or screens, with input capabilities enable the elimination of at least some physical input elements, such as buttons or keys, from portable electronic devices. Input devices such as keyboards, mice, track balls, or other input devices are increasingly being excluded or available as optional features while equivalent input capabilities are being integrated directly into the display of a device. For instance, so-called "slate" or "tablet" computers, smart phones, e-readers, hand-held multimedia devices, or any other portable electronic device may have a display that provides a virtual keyboard. By touching virtual keys on the screen, the user may type in a manner that is similar to use of a separate keyboard. Additionally, or alternatively, the user may tap or drag one or more of his or her fingers or a stylus on the display to provide input that performs functions similar to those conventionally provided by a computer mouse, track pad, track ball, or comparable apparatus.

While a virtual keyboard and other input technologies that are enabled by touch-sensitive displays are useful for reducing the size of a portable electronic device, the virtual keyboard takes up space on the display. As a result, when a virtual keyboard is displayed to enable use of the display for input, the area available for output is reduced, diminishing the quality of the output and/or the user's experience in viewing that output. Any reduction in the area available for displaying output if often undesirable, particularly when that output includes a document, video, images, or the like. Sometimes, it may be possible to reduce the size of a virtual keyboard and, thus, make a larger area on the display available for output; however, a reduced-size keyboard may also make it more difficult and more time consuming to provide input through the virtual keyboard, and may increase the likelihood of input errors and the difficulty in correcting such errors.

In an effort to allow the full area of the display device to be used, a variety of keyboards, support stands, and other accessories have been developed. For instance, a portable electronic device may have a wired or wireless connection interface that enables connection of an optional keyboard or other compatible device thereto. A support stand may also be used to prop up the portable computing device so that the display can be viewed while the user types on the keyboard. In some cases, particularly where the support stand is a separate foldable or collapsible element, use of the support stand may be complex or non-intuitive, and the user may spend more time than desired trying to manipulate the support stand to a configuration useful for supporting the portable electronic device. In other cases, the support stand is insufficiently stable to provide reliable support for the portable electronic device.

Further still, by carrying a support stand, keyboard or other accessory, along with a portable electronic device, the advantages of the minimal dimensions and all-in-one functionality of a state-of-the art portable electronic device may be lost. More particularly, the support stand, keyboard and portable electronic device are often discrete from one another, so the user must keep track of each individual item. By storing a plurality of items separately—whether in a storage case or in another manner—the potential for damaging at least one of the various components may increase, while the convenience of a highly portable electronic device decreases.

SUMMARY

A computing system may include a portable electronic device and a multi-functional support system. The multi-functional support system can include a support accessory and a computing accessory. In at least one embodiment, the support accessory includes multiple interconnected elements that can be moved into two or more configurations. As an example, the support accessory may have a supportive configuration, an open configuration, and a protective configuration. The supportive configuration may support the portable electronic device (e.g., a tablet, smart phone, multi-media device, etc.) in an at least partially upright orientation. The protective configuration may enable engagement of at least a portion of the computing accessory or the portable electronic device from damage. In a more specific example, the support accessory may, when in the protective configuration, be positioned at least partially around another device, such as a portable electronic device or a computing accessory (e.g., a keyboard, etc.), to protect that device from damage and/or excess wear and tear.

In a more specific embodiment, the support accessory may include interconnected elements, which may comprise panels (e.g., rigid or substantially rigid panels, etc.), flexible connectors (e.g., living hinges, etc.), engagement elements, and the like. Even more specifically, the support accessory may comprise a first substantially rigid element, or panel, and a second substantially rigid element, or panel, that are substantially planar and positioned adjacent to one another. The adjacent edges of the first and second panels, which may be oriented parallel to one another and hingedly associated with one another, may be referred to as "central horizontal edges," as they define a boundary between the first and second panels when the support accessory is laid flat. The opposite horizontal edges of the first and second panels are referred to as "outer horizontal edges." In this particular embodiment, each of the first and second panels includes an exterior portion and an interior portion. Together, the exterior portions of the first and second panels define an exterior portion of the support accessory, while the interior portions of the first and second panels define an interior portion of the support accessory. The exterior portion of the support assembly may completely surround the interior portion of the support assembly, and the interior and exterior portions of the support assembly may be configured to function together to enable movement of the support assembly between its protective configuration and its supportive configuration. As an example, an outer horizontal edge of the interior portion of the first panel, or the "first interior portion," which is the horizontal edge of that portion located closest to the outer horizontal edge of the first panel, may be hingedly associated with an adjacent, interior horizontal edge of the exterior portion of first panel, or the "first exterior portion." Likewise, in the second panel, an outer horizontal edge of the second interior portion and an interior horizontal edge of the second exterior portion may be hingedly associated with each other. The lateral edge on each side of the first interior portion is coextensive with the lateral edge on the corresponding side of the second interior portion, while corresponding interior lateral edges on each side of the first and second exterior portions are also coextensive with one another. Each of the lateral edges of the first and second interior portions may be positionable adjacent to, but remain separable from, a corresponding interior lateral edge of the first or second exterior portion. This lateral separation between the interior portion and exterior portions of the support assembly continues through the element that hingedly associates the central edges of the first and second panels with one another, enabling the first and second exterior portions to be pivoted or rotated relative to one another in one direction, while the first and second interior portions are pivoted or rotated relative to one another in another direction. Of course, the exterior and interior portions may also be pivoted or rotated together.

When in the supportive configuration, the exterior and interior portions of the first and second panels of the support accessory may be arranged in a way that defines a pair of support wedges. A first of the support wedges is primarily defined by the outer portion of the support accessory, defines a bottom and rear of the support accessory in the supportive configuration, and may be referred to as a "rear wedge" or an "assembly support wedge." A second of the support wedges, which is primarily defined by the interior portion of the support accessory, supports and maintains the portable electronic device in an inclined, somewhat upright orientation, may also be referred to as a "frontal wedge" or a "device support wedge." When in the supportive configuration, the exterior and interior portions of the first and second panels may be arranged in a manner that imparts the support accessory with the general shape of a triangular prism.

When the supportive configuration is no longer needed, the interior portion of the support accessory may be placed in-plane with the outer portion of the support accessory. The first and second panels may then be placed over another device, such as the computing accessory or a portable electronic device, in the protective configuration.

The computing accessory may be configured to communicate with a portable electronic device. Optionally, the computing accessory may include a keyboard for providing input to the portable electronic device. The protected device and, optionally, at least the interior surface of the support assembly when in the protective configuration may be configured complementarily to one another, such that the support assembly, when in the protective configuration, may serve as a protective cover that substantially encloses and, optionally engages the protected device. A size and shape of the interior of the protective cover may correspond to the size and shape of the keyboard.

Methods for using one or more components of a multi-functional support system, including methods for using a portable electronic device in conjunction with a multi-functional support system, are also disclosed. An example of a method for supporting a portable electronic device in an upright position may include removing a support accessory from its protective configuration over a protected device, such as a portable electronic device or a computing accessory. The support accessory can be moved from the protective configuration to the supportive configuration. The portable electronic device can then be placed on the support accessory in an at least partially upright orientation.

In at least some embodiments, a method for supporting a portable electronic device can include separating the support assembly from a protected device, such as a portable electronic device or a computing accessory. In so doing, one of the first and second panels of the support accessory may be moved away from the protected device and the other panel of the support accessory. Opening the support accessory may transition it out of the protective configuration to an open configuration. As the support accessory is opened, access to the protected device may be obtained, and the protected device may be removed from the support accessory. When this embodiment of the support accessory is in the protective configuration and the open configuration, the first interior portion may be co-planar with the first exterior portion and the second interior portion may be co-planar with the second exterior portion. When this embodiment of the support accessory is in the supportive configuration, the first interior portion and the first exterior portion are out of plane from one another, and the second interior portion and the second exterior portion are also out of plane with each other. One illustrative example of transitioning the support accessory from the open configuration to the supportive configuration may include pushing the hingedly associated interior portions of the first and second panels out of plane with the corresponding, hingedly associated exterior portions of the first and second panels. Such movement may include pivoting rotating the interior portions in one direction relative to one another while pivoting rotating the exterior portions in another direction relative to one another. The directions of pivot or rotation may be opposite. In some embodiments, linkages between the interior and exterior portions of the first and second panels may cause desired movement of each portion into a desired orientation and, thus, placement of the support assembly in the supportive configuration.

In another method, which may occur after use of the support accessory in the supportive configuration and, optionally, after use of the portable electronic device, the support accessory may be transitioned from the supportive configuration to the protective configuration over the device to be protected, such as a portable electronic device or a computing accessory. The method may include separating the portable electronic device from the support accessory. The support accessory can be transitioned from a supportive configuration to a protective configuration. For example, the first and second exterior portions of the first and second panels of the support assembly may be pulled into a substantially flat or coplanar arrangement, which also pulls the first and second interior portions into a substantially flat or coplanar arrangement. The computing accessory may then be connected to the support accessory in a manner protecting one or more surfaces of the computing accessory.

Other aspects, as well as the features and advantages of various aspects, of the disclosed subject matter will become apparent to those of ordinary skill in the art through consideration of the ensuing description, the accompanying drawings and the appended claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. The drawings are drawn to scale for some embodiments, but such scale is merely illustrative as the drawings are not drawn to scale for all embodiments. Therefore, understanding that these drawings depict only typical embodiments and are not therefore to be considered to be limiting in scope, various embodiments will be described and explained with additional specificity and detail through the use of the accompanying drawings in which:

FIG. 1D is a top plan view of the computing accessory and support accessory of FIGS. 1A-1C;

FIG. 1E is a bottom plan view of the computing accessory and support accessory of FIGS. 1A-1D;

FIGS. 5A-5D illustrate an example method of transitioning a support accessory into a protective configuration.

DETAILED DESCRIPTION

Figure 1A:
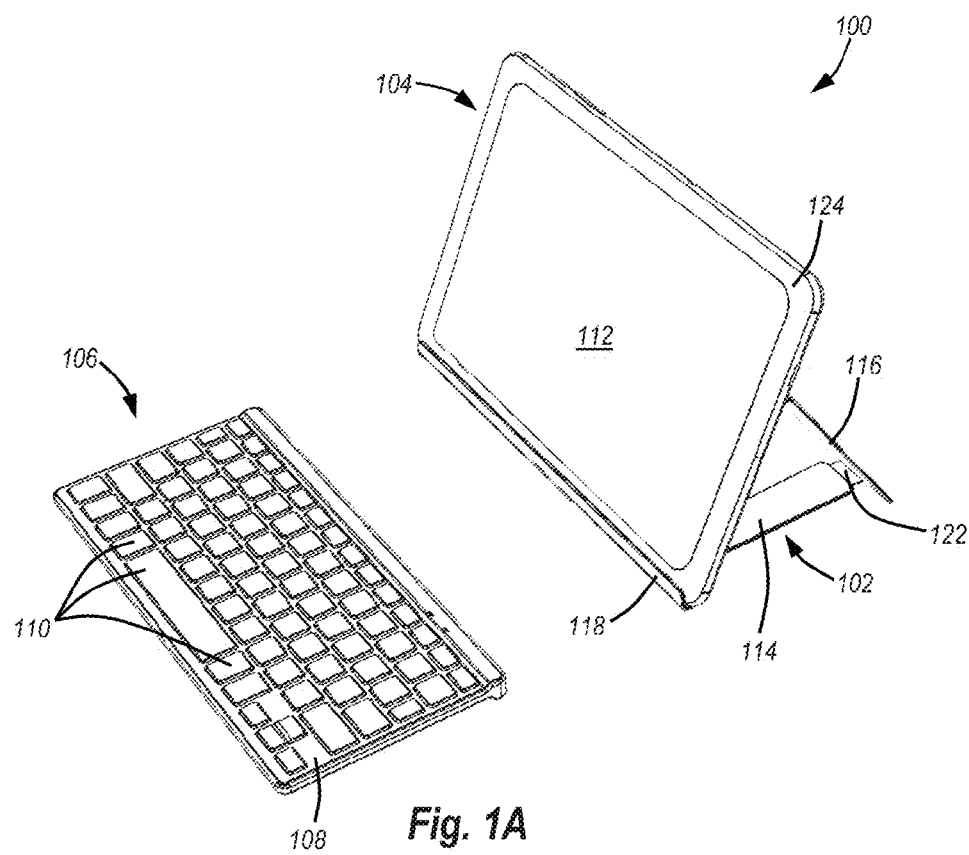
FIG. 1A is a front perspective view of a computing system according to one embodiment of the present disclosure, the computing system including a portable electronic device, a computing accessory, and a support accessory, the support accessory being in a supportive configuration for supporting the portable electronic device in an upright, landscape orientation.

Aspects of the present disclosure generally relate to support devices and accessories configured for use with portable electronic devices, and which optionally act as protective elements or covers for one or more computing accessories. By way of example and not limitation, such support accessories may be used with so-called "slate", "tablet", or "mini tablet" computing devices (e.g., various IPAD® branded devices available from Apple Inc., the XOOM™ available from Motorola Mobility, Inc., various PLAYBOOK™ branded devices available from Research in Motion Limited, the STREAK® available from Dell Inc., various GALAXY™ and NEXUS™ branded devices available from Samsung, the SURFACE™ available from Microsoft Corporation, the TRANSFORMER PAD™ available from ASUS TeK Computer Inc., etc.). Support accessories may also be used in connection with other devices such as smart phones, e-readers, hand-held multimedia devices (e.g., various IPHONE® branded devices available from Apple Inc., various KINDLE® branded devices available from Amazon Technologies, Inc., various NOOK™ branded devices available from Barnes & Noble, Inc., etc.), or any other portable electronic devices. In at least some embodiments of the present disclosure, support accessories are optionally configured for use with computing accessories usable with portable electronic devices. A support accessory may, for instance, have multiple arrangements, positions, configurations or orientations and be able to transition between a first configuration for supporting a portable electronic device in an at least partially upright or working orientation, and a second position for protecting a computing accessory and/or a portable electronic device. Computing accessories usable with embodiments of the present disclosure may include keyboards, speakers, printers, docking stations, power supplies, storage/memory devices, etc.

The principles and uses of the teachings of the present disclosure may be better understood with reference to the accompanying description, figures and examples. It is to be understood that the details set forth herein and in the figures are presented as examples, and are not intended to be construed as limitations to the disclosure. Furthermore, it is to be understood that the present disclosure and embodiments related thereto can be carried out or practiced in various ways and that aspects of the present disclosure can be implemented in embodiments other than the ones outlined in the description below.

It is further to be understood that the terms "including," "comprising," "having" and grammatical variants thereof do not preclude the addition of one or more components, features, steps, or integers or groups thereof and that the terms are to be construed as specifying components, features, steps or integers. The phrase "consisting essentially of," and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method. By way of illustration, a portable computing system may consist essentially of a portable electronic device, a computing accessory, and a support accessory. Such language reciting "consisting essentially of" need not, however, exclude other elements such as connector cables, battery chargers, etc. The phrase "consisting of" and grammatical variations thereof, when used herein, should be construed as excluding additional elements other than the particular elements so recited, but not excluding components of the particular elements recited. For instance, a computing accessory consisting of a keyboard and communication interface could exclude elements such as a monitor. The recited keyboard or communication interface may, however, include other components such as keys, a trackball, communication ports, processors, power supplies, etc.

The above described phrases may also be used in combination. For illustrative purposes only, a portable computing system may comprise a support accessory, a portable electronic device, and a computing accessory, with the support accessory consisting of multiple support panels connected using one or more connectors. Such an example may allow additional elements in addition to the support accessory, portable electronic device, and accessory. The support accessory may, however, be limited to the recited supports and connection elements, although such elements themselves may have further features or characteristics. As will be appreciated in view of the disclosure herein, such an example is merely illustrative, and a support accessory or computing system according to embodiments of the present disclosure may take other forms, include fewer elements, include additional elements, or otherwise vary from the particular example described.

To the extent the specification or claims refer to "an additional" or "other" element, feature, aspect, component, or the like, it does not preclude there being exactly one, or more than one, of the additional element. It is to be understood that where the claims or specification refer to "a" or "an" element, such reference is not be construed that there necessarily is only one of that element. It is to be understood that where the specification states that a component, feature, structure, or characteristic "may," "might," "can," or "could" be included, that particular component, feature, structure, or characteristic is not required to be included, but may be optional or non-essentially included in some embodiments of the present disclosure.

Methods of the present disclosure may be implemented by performing or completing selected steps, acts, or tasks manually, automatically, or using a combination thereof. As used herein, the terms "method" or "process" refer to manners, means, techniques and procedures for accomplishing a given task including, but not limited to, those manners, means, techniques and procedures either known to, or readily developed from known manners, means, techniques and procedures by practitioners of the art to which the present disclosure belongs. The descriptions, examples, methods and materials presented in the claims and the specification are not to be construed as limiting but rather as illustrative only.

Relational terms such as, but not exclusively including, "bottom," "below," "top," "above," "back," "front," "left", "right", "rear", "forward", "up", "down", "horizontal", "vertical", "clockwise", "counterclockwise," and the like, as used herein do not necessarily indicate a particular orientation is required. For example, a "bottom" component may be below a "top" component, or a component that is "below" another component may for purposes of illustration or description, but does not require that such a component be or remain at a lower elevation than another component. Similarly, a component that is "above" need not be over or at a higher elevation as compared to another component. Rather, such designations are purely to facilitate reference to multiple components, including those illustrated in referenced figures. As such, directions, components or both are referenced purely for convenience, or may be reversed, flipped, rotated, moved in space, placed in a diagonal orientation or position, placed horizontally or vertically, or similarly modified. Accordingly, it will be appreciated that such example terms are to be used herein for differentiation purposes only, to describe the relative positioning or placement of certain components relative to certain embodiments including those in the referenced figures, to differentiate between first and second components, or for any combination of the foregoing. Additionally, descriptions may refer to certain components or elements using designations such as "first," "second," "third," and the like. Such language is merely provided for differentiation purposes, and is not intended limit a component to a singular designation. As such, a component referenced in the specification as the "first" component may be, but is not necessarily, the same component that may be referenced in the claims as a "first" component.

Meanings of technical and scientific terms used herein are to be commonly understood as by one of ordinary skill in the art to which embodiments of the present disclosure belong, unless otherwise defined. Embodiments of the present disclosure can be implemented in the testing or practice with methods and materials equivalent or similar to those described herein.

Figure 1B:
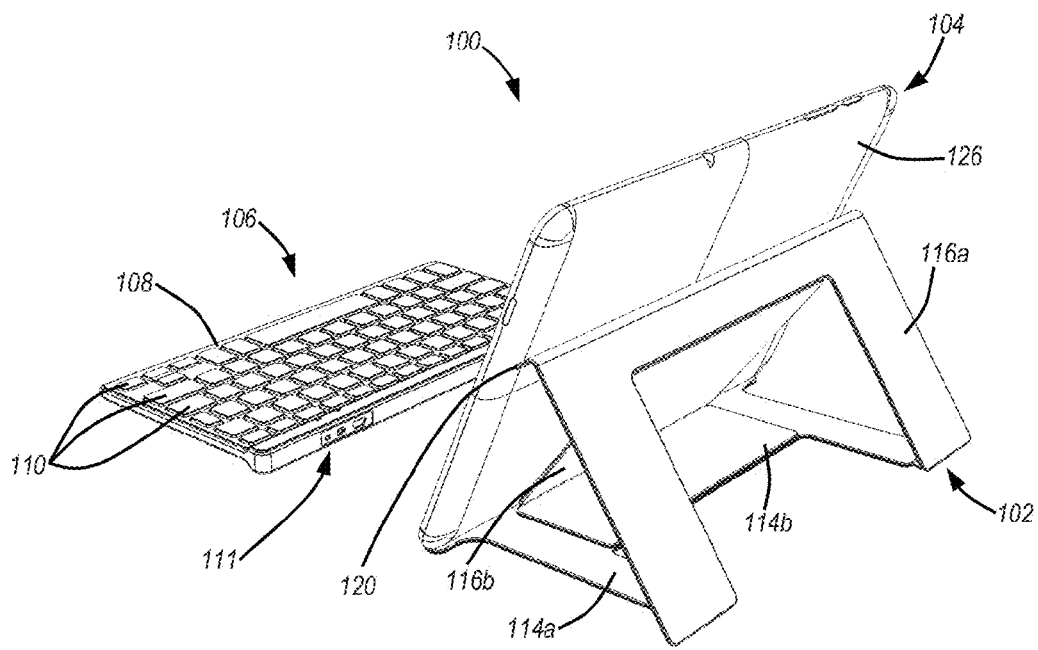
FIG. 1B is a rear perspective view of the computing system of FIG. 1A.
Figure 1C:
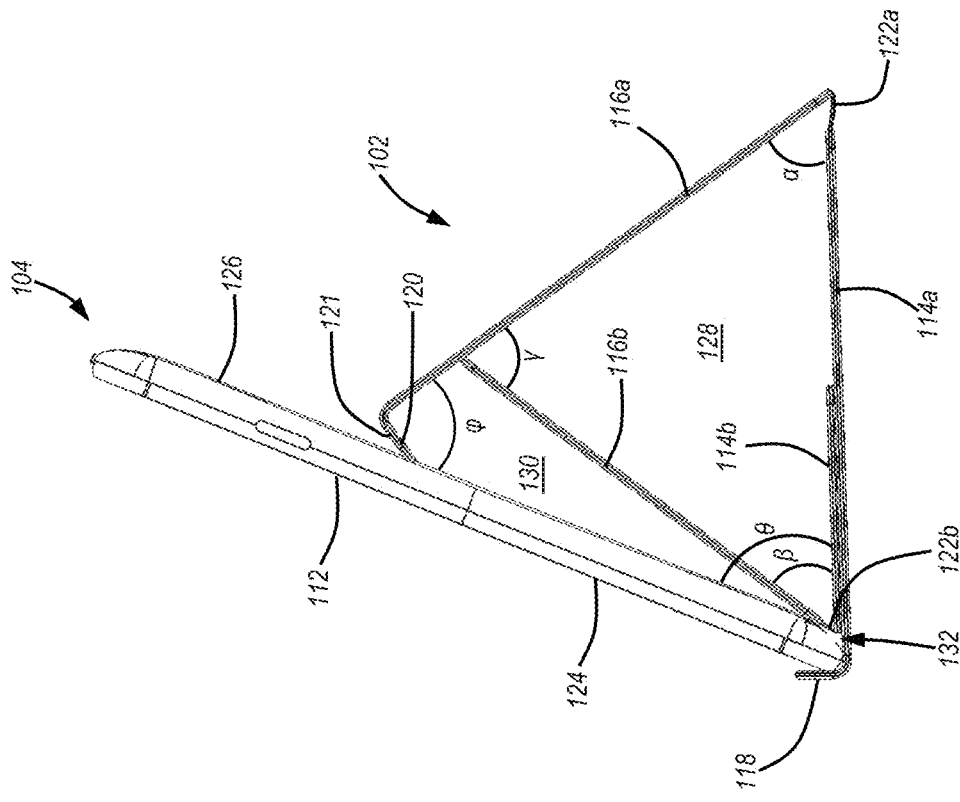
FIG. 1C is a side view of the computing system of FIGS. 1A and 1B.
Figure 1C:
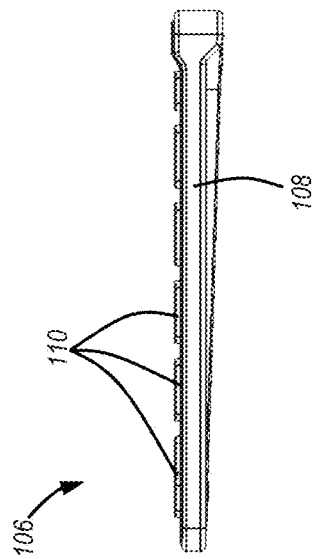
Figure 1F:
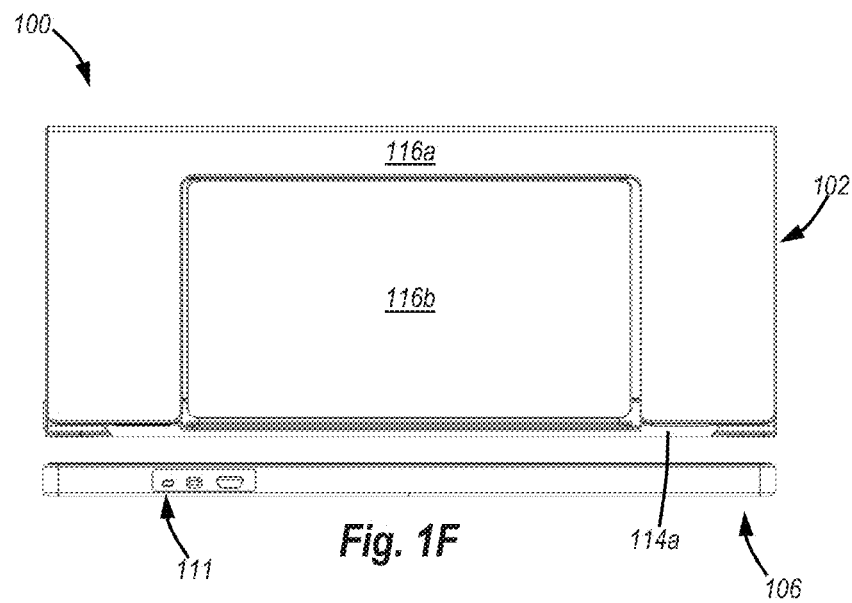
FIG. 1F is a rear view of the computing accessory and support accessory of FIGS. 1A-1E.
Figure 1G:
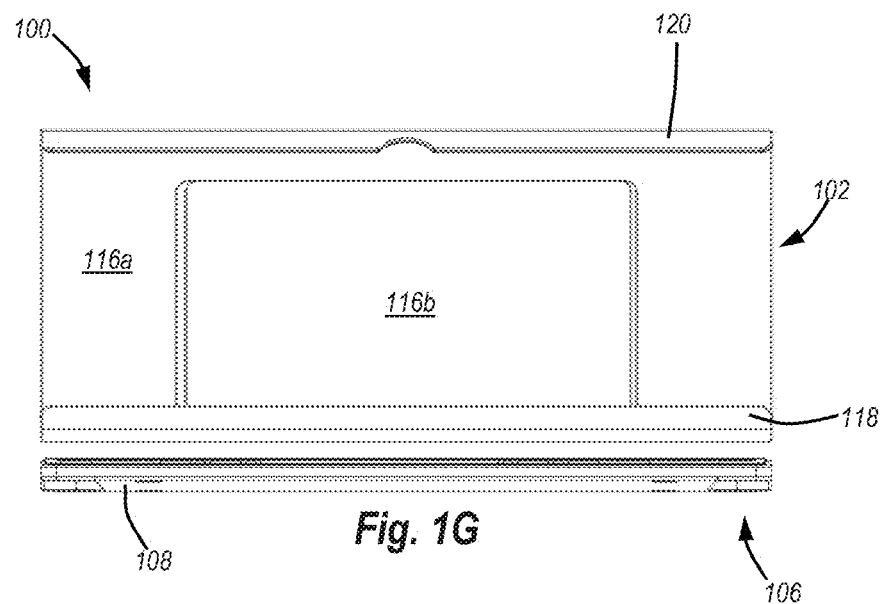
FIG. 1G is a front view of the computing accessory and support accessory of FIGS. 1A-1F.

FIGS. 1A-1G illustrate example embodiments of a portable computing system 100 according to one embodiment of the present disclosure. As best shown in FIGS. 1A-1C, a portable computing system 100 may include a support accessory 102, a portable electronic device 104, and a computing accessory 106.

In the illustrated embodiment, the portable electronic device 104 is illustrated as being supported by the support accessory 102 in an at least partially upright orientation. To facilitate such support, the support accessory 102 may be positioned in a supportive configuration, an example of which is illustrated in FIGS. 1A-1G, although a supportive configuration may take any number of other forms. In some embodiments, such as those discussed hereafter with respect to FIGS. 4A-5F, a support accessory 102 according to embodiments of the present disclosure may also be selectively changeable between configurations or positions. In still other embodiments, the support accessory 102 may be substantially fixed in a single position, configuration or orientation.

The illustrated portable electronic device 104 is one example of a device that may be supported by support accessory 102. More particularly, according to some embodiments of the present disclosure, the portable electronic device 104 may include a slate, tablet or mini-tablet computing device, an e-reader, a smart phone, a portable gaming system, a hand-held multimedia device, a personal digital assistant, a GPS device, or any number of other types of electronic devices. Accordingly, the illustrated embodiment should not be construed as limiting of the types of devices that may be used in connection with the support accessory 102.

The portable electronic device 104 is optionally usable in connection with a computing accessory 106. The computing accessory 106 may include, in at least some embodiments of the present disclosure, a keyboard 108. Such a keyboard 108 may have any number of different configurations. For instance, the keyboard 108 may include a number of keys 110 arranged in any particular pattern or other arrangement. By way of illustration, the keyboard 108 of the illustrated embodiment may arrange keys 110 (e.g., alphanumeric keys) in a QWERTY-style layout. Additional or other keys are optionally included for providing directional inputs, functional controls, and the like. Some keys may be used for multiple purposes (e.g., a key can in one mode provide alphanumeric input while in another may provide directional input). Other configurations or layouts (e.g., alphabetical, 10-key, etc.) of keys 110 may be utilized.

Regardless of the particular layout of the keys 110, the keyboard 108 may be configured for use with the portable electronic device 104 or another electronic or computing device in any suitable fashion. The keyboard 108 may, for instance, have wireless capabilities (e.g., Infrared, Bluetooth, 802.11a/b/g/h, etc.). In accordance with one embodiment, a communication interface 111 may be provided. Such a communication interface 111 may include or connect to circuitry, hardware, software, other components, or other components that facilitate communicatively coupling the keyboard 108 to the portable electronic device 104. In some embodiments, the communication interface 111 may include a button, switch, toggle, or other component, or any combination of the foregoing. Such components may, for instance, allow the keyboard 108 to be powered on or off, search for, initiate, or maintain a wireless connection, or enable any number of other actions.

In some embodiments, the communication interface 111 of the computing accessory 106 may be configured to use any of multiple, different communication protocols. For instance, a multi-position switch or other input may have two or more settings. One setting may signal via hardware, software or a combination thereof that the user is requesting that the computing accessory 106 communicate with a portable electronic device 104 of a first type or using a first protocol (e.g., a device using an iOS™ operating system). A second setting may indicate that the computing accessory 106 is being requested to communicate with a portable electronic device 104 of a second type or using a second protocol (e.g., a device using an ANDROID™ or WINDOWS® operating system). Depending on the setting of the communication interface 111, different communication protocols are optionally used. Alternatively, the same communication protocol may be used, but information may be formatted or packaged in different manners depending on the setting of the communication interface 111 or the associated portable electronic device 104. Accordingly, various formatting and/or communication protocols (e.g., Wi-Fi, Bluetooth, etc.) may be utilized based on a user-selected setting. Of course, the foregoing is merely illustrative. In some embodiments, the communication interface 111 may be configured for use with a single type of electronic device, have a fixed or adjustable setting usable with more than a single type of device, may auto-detect the type of electronic device and automatically determine the communication settings or protocols needed, or be otherwise configured. In still other embodiments, the communication interface 111 may include or connect to other components. For instance, the communication interface 111 may include ports or connectors for power input, audio input/output, infrared communication, or the like.

As will be appreciated in view of the disclosure herein, the computing accessory 106 may take other forms or have other components besides those specifically illustrated or described herein. For instance, in lieu of, or in addition to, the communication interface 111 using a wireless connection, the accessory 106 may use a physical connection. As an example, a communication cable (e.g., USB cable, serial cable, etc.) may be configured to communicatively couple the computing accessory 106 to the portable electronic device 104. Other physical communication connections may also be used.

The computing accessory 106 may further include other or additional capabilities. Thus, while the computing accessory 106 is illustrated as including the keyboard 108, the computing accessory 106 may include or have the form of any number of additional or other devices or features. For instance, other computing accessories usable in connection with embodiments of the present disclosure may include any combination of: batteries or other power sources configured to provide primary or backup power for an electronic device; audio devices (e.g., speakers, microphones, turntables, mixers, etc.); printers; scanners; peripheral storage or memory devices (e.g., disk drives, hard drives, solid state storage devices, optical disc drives, etc.); communication elements configured to provide alternate and/or additional means of communication (e.g., USB or USB micro ports, HDMI ports, FireWire interfaces, i.LINK interfaces, Lynx interfaces, 8P8C jacks, etc.); other devices or accessories; or any combination of the foregoing. In still other embodiments, the accessory 106 may be eliminated or selectively used. The portable computing system 100 may thus include a portable electronic device 104 and a support accessory 102, without necessarily including or utilizing a corresponding computing accessory 106 of any particular size or utility.

Turning now to the support accessory 102, FIGS. 1A-1C illustrate an example embodiment in which the portable electronic device 104 may be at least partially supported by the support accessory 102. The support accessory 102 may be used alone or in combination with other elements to position and/or support the portable electronic device 104 in an at least partially upright position, or otherwise position the portable electronic device 104 in a desired manner. More particularly, the example portable electronic device 104 may include a display 112 which may provide graphical, textual, visual, or other output perceptible by a user. Optionally, the display 112 includes input capabilities (e.g., a touch screen with pressure, resistive, capacitive, or other touch-screen or similar input technology). In some embodiments, the display 112 may include a touch-screen component in addition to, or in lieu of, the keyboard 108 of the computing accessory 106.

The display 112 may have any suitable size and/or configuration. In FIG. 1A, for instance, the display 112 may have a particular aspect ratio (e.g., 16:9, 4:3, etc.) that allows for the display 112 to be oriented in differing landscape and portrait orientations. Optionally, the support accessory 102 can support the portable electronic device 104 regardless of whether oriented in a landscape, portrait or other orientation. Further, the size of the display 112 may vary based on a number of factors, including the type of device being used. For instance, a tablet, mini-tablet or slate computing device may have, by way of illustration, a diagonal dimension of between about six inches (152.4 mm) and about twenty inches (508 mm), although in other embodiments the same dimensions may be less than about six inches or larger than about fifteen inches. In another embodiment, a smart phone or multimedia device may have a display with a diagonal dimension of between about two inches (51 mm) and about five and a half inches (140 mm), although other embodiments may include smart phones, e-readers, multimedia devices, tablet computing devices, or other electronic devices with smaller or larger displays.

In FIGS. 1A-1G, the example support accessory 102 is illustrated in an example supportive position. In the illustrated supportive position, the support accessory 102 may connect to, or otherwise support the portable electronic device 104 and maintain the portable electronic device 104 in an at least partially upright or working position. One manner in which support accessory 102 may provide such support is through the use of a set of interconnected structures 114-120 that each directly or indirectly support the portable electronic device 104. The interconnected structures 114-120 may take any suitable form, and a more particular description of one example set of interconnected structures is provided hereafter.

More particularly, in some embodiments of the present disclosure the portable electronic device 104 may supported in an inclined fashion, so as to be in an angled, upright orientation, an example of which is best illustrated in the side view of FIG. 1C. In general, the portable electronic device 104 may not easily sustain itself in an upright or partially upright, inclined position such as that shown in FIG. 1C. Accordingly, to maintain the portable electronic device 104 in a desired orientation, the support accessory 102 may include interconnected support structures 114-120 and connectors 122. The interconnected support structures 114-120 may cooperate to engage and support the portable electronic device 104, while also being stabilized on one or more foundational structures (e.g., a table, floor, or wall surface) to restrict unwanted movement of the portable electronic device 104. For instance, relative to the view illustrated in FIG. 1C, a first device support structure 114a may be configured as a base that can rest on a surface of a desk, table, floor, or other surface. Optionally, such a surface is generally horizontal. In some embodiments, the first device support structure 114a is a generally planar panel having upper and lower surfaces. Thus, the lower surface may rest upon or otherwise engage one or more foundational surfaces.

The first device support structure 114a may directly or indirectly connect to a proximal end of a second device support structure 116a, which may be referred to herein as a rear support structure. In the illustrated embodiment, the second device support structure 116a is shown as being angled relative to the first device support structure 114a and extending in an at least partially vertical direction relative thereto. More particularly, the illustrated embodiment depicts the second device support structure 116a connecting at or near the illustrated rear edge of the first device support structure 114a, while a front edge of the first device support structure 114a is near the lower edge of the portable electronic device 104. In the illustrated embodiment, a connector 122a can connect the first device support structure 114a to the second device support structure 116a. In some embodiments, the connector 122a may be flexible, hinged, or otherwise configured so as to allow the second device support structure 116a to be offset at an angle α relative to the first device support structure 114a.

The first and second device support structures 114a, 116a optionally connect to third and fourth device support structures 118, 120, respectively. More particularly, the third device support structure 118 is illustrated as connecting at or near the illustrated front edge of the first device support structure 114a, so as to be proximate the portable electronic device 104 and on an opposite side of the first device support structure 114a relative to the connector 122a. The third device support structure 118 may be referred to herein as a front support structure, and in the illustrated embodiment is offset at an angle relative to the first device support structure 114a. In some embodiments, the angle is about ninety degrees, although such an angle is only an example.

The fourth device support structure 120 optionally connects directly or indirectly to a distal or upper end of the second device support structure 116a, opposite the connector 122a, and is optionally angled relative to the second device support structure 116a. In the illustrated embodiment, the fourth device support structure 120 is elevated relative to the first device support structure 114a, and may be referred to herein as an upper support structure.

In some embodiments, the angles between one or more of the support structures 114-120, if any, may be selectively varied. For instance, the connector 122a may pivot, hinge, flex, or otherwise allow the angle α to be varied. Similarly, a living hinge or other connector may connect the second device support structure 116a to the fourth device support structure 120, thereby allowing each to rotate, flex, hinge, or otherwise move relative to each other. Optionally, the angle between the first and third device support structures 114a, 118 may be variable in a similar manner. Additionally, or alternatively, one or more of the angles between the device interconnected support structures 114-120 may be fixed. For instance, in one embodiment, the angle between the first and third device support structures 114a, 118 may be temporarily or permanently fixed or otherwise structured to resist substantial variation in the angle therebetween.

A manner in which the device interconnected support structures 114-120 and connector 122 can be used to support the portable electronic device 104 in an upright position is shown in FIGS. 1A-1G. In particular, and as best shown in FIG. 1C, a lower edge of the portable electronic device 104 may be positioned at or near the third device support structure 118, and optionally on or near an interior surface of the first device support structure 114a. A front surface 124 of the portable electronic device 104—which is optionally about co-planar with the display 112—may be positioned to be adjacent or abutting an interior surface of the third device support structure 118. In contrast, a rear surface 126 of the portable electronic device 104 may be positioned against or adjacent to an exterior or upper surface 121 of the fourth device support structure 120. In the illustrated embodiment, the rear surface 126 of the portable electronic device 104 is placed in contact with an exterior surface 121 and/or lower, distal edge of the fourth device support structure 120, although such an embodiment is merely one example of using the fourth device support structure 120 to at least partially support the portable electronic device 104.

In general, and relative to the view shown in FIG. 1C, positioning of the portable electronic device 104 relative to the support accessory 102 can sustain the portable electronic device 104 at an equilibrium position. More particularly, if the support accessory 102 is removed and the portable electronic device 104 is placed on its lower edge in the upright orientation illustrated in FIG. 1C, gravitational or other forces would generally cause the portable electronic device 104 to fall or otherwise move. With the support accessory 102 in place, the support accessory 102 can oppose and counteract such forces. For instance, the fourth device support structure 120 may engage the rear surface 126 of the portable electronic device 104 while the third device support structure 118 engages the front surface 124 of the portable electronic device 104. In some embodiments, the third device support structure 118 can engage the front surface 124 of the portable electronic device 104 and act as a brake to resist movement at the lower portion of the portable electronic device 104. The first device support structure 114a can also optionally restrict movement of the portable electronic device 104 by, for instance, restricting movement in a downward direction. More generally, the support accessory 102 can create a leveraged position in which the portable electronic device 104 is at equilibrium and maintained at a desired orientation. Such can occur by, for instance, restricting movement of the bottom end of the portable electronic device 104 in a first direction (e.g., left in FIG. 1C), while also restricting movement at a higher position in an opposite direction (e.g., right in FIG. 1C). As will also be appreciated in view of the disclosure herein, the leverage created by the support accessory 102 can restrict or prevent rotation of the portable electronic device 104 (e.g., rotation in a clockwise direction).

To further facilitate maintaining the portable electronic device 104 in the desired orientation, FIGS. 1A-1G illustrates that embodiments of the support accessory 102 may include optional additional or alternative support structures. In particular, in the example embodiment illustrated, the first and second device support structures 114, 116 each include both exterior portions 114*a*, 116*a* and interior portions 114*b*, 116*b*. The interior support structures are optionally connected to each other using an interior connector 122*b* that may in some embodiments be a portion of the connector 122.

More particularly, and relative to the side view in FIG. 1C, the first interior support structure 114*b* optionally rests on or is adjacent the first exterior device support structure 114*a*, while the second interior support structure 116*b* may extend generally from the first interior support structure 114*b* and connect directly or indirectly to, or engage, the second exterior device support structure 116*a*. In some embodiments, the first and second interior support structures 114*b*, 116*b* may maintain the support accessory 102 at a desired angular or other position or arrangement and/or reduce the risk that the support accessory 102 will inadvertently move or collapse while supporting the portable electronic device 104. For instance, where the connector 122*a* allows an angular offset a between the first and second device support structures 114*a*, 116*a* to change, the possibility could exist for the second device support structure 116*a* to rotate counter-clockwise (relative to the view shown in FIG. 1C) and move to an orientation that is about parallel to the illustrated orientation of the first device support structure 114*a*. Such movement may be undesirable in some embodiments or configurations, and the interior support structures 114*b*, 116*b* may reduce the risk of such rotation or movement.

More particularly, the first and second interior support structures 114*b*, 116*b* may include one or more structural portions that substantially maintain their shape and/or position when the weight of a portable electronic device 104 is placed on the support accessory 102. Such structural portions may be rigid or substantially rigid, and in the illustrated embodiment connect to the first and second exterior device support structures 114*a*, 116*a*. As shown in FIG. 1C, the connection of the first and second exterior device support structures 114*a*, 116*a* to the second interior device support structure 116*b* may define a supporting wedge. More particularly, in the illustrated embodiment, the first interior support structure 114*b* can rest upon the first exterior support structure 114*a* and connect to, and be angled relative to, the second interior support structure 116*b* which may connect to the second exterior support structure 116*a*. The angle between the first and second interior support structures 114*b*, 116*b* may define a supportive wedge. As best illustrated in FIG. 1B, the supportive wedge is optionally open the rear of the support accessory 102. In a similar manner, the first exterior support structure 114*a* and the second exterior support structure 116*b* can also collectively create a supportive wedge, which supportive wedge has the angle α. As best viewed in FIGS. 1A-1C, the supportive wedge formed by the first and second exterior support structures 114*a*, 116*a* may open towards the portable electronic device 104, while the first and second interior device supports 114*b*, 116*b* may define a wedge that opens away from the portable electronic device 104 (e.g., towards the second exterior support structure 116*a*).

As will also be apparent to one of skill in the art in view of at least the embodiment in FIGS. 1A-1G as disclosed herein, the support accessory 102 may in some embodiments maintain its position at an orientation that defines a generally triangular structure, although other embodiments are also contemplated. More particularly, in at least one embodiment and as best shown in FIG. 1C, the support wedge defined by the first and second interior support structures 114*b*, 116*b*, when viewed from a side view, optionally defines a front portion of a generally triangular structure 128, while the support defined by the first and second exterior support structures 114*a*, 116*a* defines a rear portion of the generally triangular structure 128. The angles defining the triangular structure 128 may vary as desired. In the illustrated embodiment, the sides of the generally triangular structure 128 are offset at angles represented by the angles α, β and γ, the sum of which may be about one-hundred eighty degrees.

In general, each of the angles α, β and γ may vary depending on the particular size, shape, and configuration of the support accessory 102. For instance, the angles α, β and γ may vary between about 30° and about 105°, although in other embodiments any one or more of angles α, β and γ may be less than 30° or greater than 105°. In one example embodiment, angle α may be between about 35° and about 75°. In another embodiment, the angle α may be between about 45° and about 65°. In still another embodiment, the angle α may be between about 50° and about 60°. For instance, the angle α may be about 55°±5°. The angle β may similarly vary. In one embodiment, for instance, the angle β may be between about 30° and about 70°. In another embodiment, the angle α may be between about 40° and about 60°. In still another embodiment, the angle α may be between about 45° and about 55°. In at least one embodiment, the angle β may be about 53°±5°.

The angle γ may vary as necessary, and can vary to form the generally triangular structure 128 in some embodiments. In one embodiment, the angle γ is between about 50° and about 90°. In another embodiment, the angle γ is between about 60° and about 80°. In still another embodiment, the angle γ may be between about 65° and about 75°. As an example, the angle γ may be about 72°±5° in accordance with one embodiment of the present disclosure, although in other embodiments the angle γ may be greater than about 90° or less than about 50°.

The foregoing examples and ranges are merely illustrative, and in other embodiments, the generally triangular structure 128 may have another form, with other angles or a different shape. For instance, a support structure may be triangular with one obtuse or right angle, with three acute angles, or may be rectangular, T-shaped, trapezoidal, or otherwise configured.

When the support accessory 102 is used in connection with a portable electronic device 104, a second generally triangular or other structure 130 may also be formed. In FIG. 1C, for instance, the generally second triangular structure 130 may generally be defined by the first and second exterior device support structures 114*a*, 116*a*, and the portable electronic device 104, each of which are offset at respective angles. The fourth device support structure 120 may also define a portion of the generally triangular shape of the generally triangular structure 130. In some embodiments, the first generally triangular structure 128 provides strength, support, reinforcement or stability to the second generally triangular structure 130.

According to at least one embodiment, the second generally triangular structure 130 may intersect, connect to, or overlap the generally triangular structure 128. More particularly, as shown in the illustrated embodiment, the first generally triangular structure 128 may be wholly within the second generally triangular structure 130, and/or may optionally share all or a portion of one or more sides therewith. More particularly in one embodiment, all or a portion of the first and/or second exterior support structures 114a, 116a may define portions of both generally triangular structures 128, 130. In other embodiments, other configurations may be used. For instance, the generally triangular structures 128, 130 may partially overlap, be positioned back-to-back, or have other configurations such that one structure is not wholly within another structure.

At least some embodiments contemplate the use of multiple triangular or other support structures as described, in which one or more angles are common to both structures. For instance, in the illustrated embodiment, the angle $\alpha$ generally defines one of the angles for each of the two generally triangular structures 128, 130. The angles $\beta$ and $\gamma$, however, may not be common to both structures. Instead, as shown in FIG. 1C, the second generally triangular structure 130 may be defined by other angles, which are identified as $\theta$ and $\phi$. In the particular embodiment illustrated, the angle $\theta$ may generally be measured as the angular offset of the portable electronic device 104 relative to the first exterior device support structure 114a and/or the first interior device support structure 114b. The angle $\phi$ may generally be measured as the angular offset between the portable electronic device 104 relative to the second exterior device support structure 116a. In the illustrated embodiment, in which the angle $\alpha$ is common to both generally triangular structures 128, 130, the angle $\beta$ may be less than the angle $\theta$, and the angle $\gamma$ may be greater than the angle $\phi$, although such relationship is optional. In some embodiments, the difference in the angles $\theta$ and $\beta$ may be about equal to the difference between the angles $\gamma$ and $\phi$.

The angles $\alpha$, $\theta$ and $\phi$ of the generally triangular structure 130 may vary in any suitable manner, although in one embodiment the sum of angles $\alpha$, $\theta$ and $\phi$ is about one-hundred eighty degrees. More particularly, the angle $\alpha$ may vary as described elsewhere herein, or may vary in another suitable manner (e.g., where the angle is not common to both generally triangular structures 128, 130). Angles $\theta$ and $\phi$ may also be varied based on the particular construction of the support accessory 102. For instance, in one embodiment, the angle $\theta$ may vary between about 45° and about 85°. In another embodiment, the angle $\theta$ may vary between about 55° and about 75°. In still another embodiment, the angle $\theta$ may vary between about 60° and about 70°. By way of example, the angle $\theta$ may be about 67°±5°.

The angle $\phi$ may thus also vary and in at least one embodiment the angle $\phi$ may measure between about 35° and about 75°. In another embodiment, the angle $\phi$ is between about 45° and about 65°. In still another embodiment, the angle $\phi$ may be between about 50° and about 60°. For instance, the angle $\phi$ may be about 57°±5°.

Figure 2:
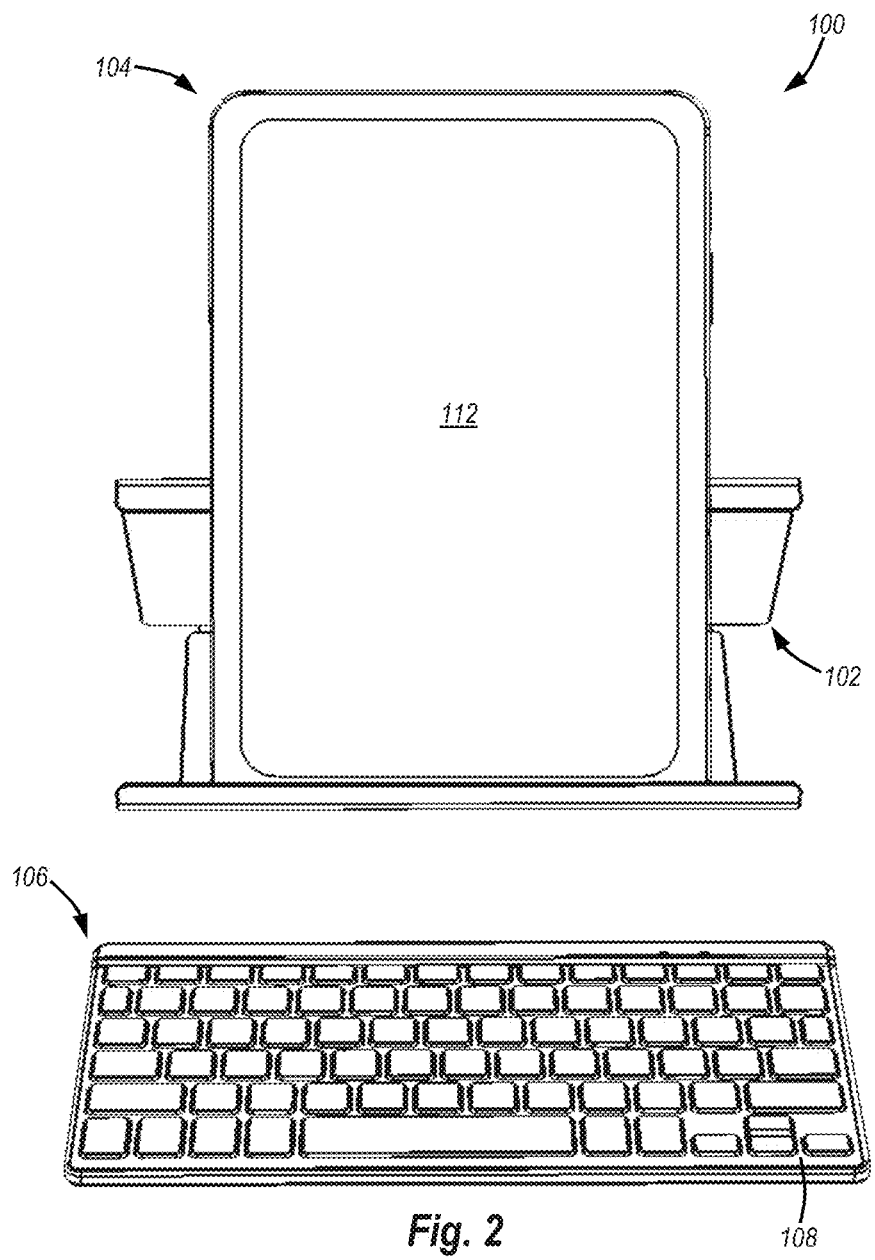
FIG. 2 is a front perspective view of the computing system of FIG. 1A, with the portable electronic device being supported by the support accessory in an upright, portrait orientation.

Embodiments of the present disclosure may allow any number of different portable electronic devices to be supported in an upright orientation by the same support accessory 102. In general, the term "upright position" is intended to include both fully and partially upright positions. In a fully upright position, a portable electronic device 104 may be oriented at about a right angle relative to a foundational surface (e.g., a table, desk, floor, etc.). In a partially upright position, a portable electronic device 104 may be oriented at an angle that is generally non-perpendicular and non-parallel relative to the supportive surface, which angle may often allow a user of the portable electronic device 104 to easily view or interact with the display 112. For instance, the angle $\theta$ of FIG. 1C may be about equal to the angle between the portable electronic device 104 and the foundational surface. In some embodiments, the portable electronic device 104 may be oriented in an upright, landscape position (see FIGS. 1A-1C), while in other embodiments, the portable electronic device 104 may be oriented in an upright, portrait position (see FIG. 2). In accordance with at least one embodiment of the present disclosure, the support accessory 102 may maintain substantially the same configuration, position, or orientation while supporting the portable electronic device 104 in either a landscape or portrait position.

The dimensions of the support accessory 102 may be such that they allow the support accessory 102 to be used with multiple types of portable electronic devices. For instance, as best shown in FIG. 1C, the first interior support structure 114b may be positioned along a frontal portion of the first exterior device support structure 114a, but may not extend to the third device support structure 118. As such, an opening 132 may be formed as a gap, channel, chamber, or in another manner, and may be present between the third device support structure 118 and the generally triangular structure 128. The size of the opening 132 may be sufficient to allow an edge of the portable electronic device 104 to be positioned therein. In some embodiments, the width of the opening 132 is about equal to the thickness of the portable electronic device 104 at the corresponding edge. In other embodiments, however, the width of the opening 132 may be greater than the thickness of the portable electronic device 104. In still other embodiments, the width of the opening 132 may be less than a corresponding thickness of the portable electronic device 104. In such an embodiment, the exterior surface of the second interior device support structure 116b optionally contacts or engages the portable electronic device 104. The width of the opening 132 may therefore be sufficient to allow devices of different thicknesses to be placed therein and supported by the support accessory 102.

As discussed herein, aspects of the present disclosure allow the portable computing system 100 to include or be utilized in connection with a computing accessory 106 that can communicate or otherwise operate in connection with the portable electronic device 104. The computing accessory 106 may have any suitable size, shape, structure, or purpose. For instance, the computing accessory 106 illustrated in FIGS. 1A-1G and FIG. 2 includes a keyboard 108 that may be used for typing or other input that can be transferred or provided to the portable electronic device 104; however, other accessories are contemplated.

In some embodiments, the size, shape, or other configuration of the computing accessory 106 may generally correspond to the size and/or configuration of the support accessory 102. For instance, as noted herein, the support accessory 102 is optionally changeable between multiple configurations, orientations, positions or arrangements. In one embodiment, the support accessory 102 may cooperate with the portable electronic device 102 in a first configuration (e.g., a support configuration), while cooperating with the computing accessory 106 while in a second position (e.g., a protective configuration).

FIGS. 3A-3G illustrate an exemplary embodiment of a computing system 200 in which a support accessory 202 may be oriented in a second position, arrangement or configuration to cooperate with a computing accessory 206. More particularly, in the illustrated embodiment, the second configuration corresponds to a protective or cover configuration in which the support accessory 202 may act as a protective cover for at least a portion of the computing accessory 206.

The support accessory 202 may include multiple components that may be oriented in a manner that collectively define the protective position. For instance, in FIGS. 3A-3C, various structures 214-222 may be positioned in a manner that defines an opening 238 into which at least a portion of the computing accessory 206 may be positioned. The various structures 214-222 may include panels or other structures and optionally correspond to support structures and connectors described and/or illustrated with relative to FIGS. 1A-1G and FIG. 2. In some embodiments, any one or more of the structures 214-222 is substantially rigid, includes substantially rigid portions, or includes or connects to other structures so as to be able to provide protection to the computing accessory 206.

In FIGS. 3A-3G, a computing accessory 206 is illustrated as having a generally rectangular configuration, and includes a rear surface 234, a front surface 236, a top surface 240, a bottom surface, and opposing side surfaces 244, 246. The illustrated support accessory 202 is also illustrated as having a generally rectangular configuration while in the protective position. More particularly, structures 214, 216 may generally have rectangular shapes and can define the top and bottom surfaces of the support accessory 202 while in the protective configuration. A front side in the protective configuration may be defined by the structure 222, and a rear side in the protective configuration may be formed by one or both of structures 218, 220, which optionally overlap as shown in FIGS. 3A-3G.

In the illustrated embodiment, the support accessory 202 is optionally open at one or more sides. As a result, the side surface 246 of the accessory 206 may be positioned within the opening 238 and the computing accessory 206 may be slid or otherwise moved in the direction of arrow A to insert the computing accessory 206 into the support accessory 202. When within the support accessory 202, the rear and front surfaces 234, 236 and top and bottom surfaces 240, 242 may be fully or partially covered or shrouded by respective portions of the support accessory 202.

According to at least one aspect of some embodiments of the present disclosure, the support accessory 202 may act as a protective cover that is optionally configured to protect the computing accessory 206 from damage. For instance, the support accessory 202 may provide a measure of protection in the event the computing accessory 206 is dropped during transportation or in other circumstances. The computing accessory 206 may also frequently be placed in a bag or other container with other objects, and the support accessory 202 may provide a measure of protection so that it is not crushed or otherwise damaged by other objects while in storage.

Optionally, the support accessory 202 can provide such protection without significantly adding to the dimensions of the computing accessory 206 assembled with the support accessory 202. Without limiting the scope of the present disclosure, in some embodiments, when the support accessory 202 is in a protective or storage configuration relative to the computing accessory 206, the support accessory 202 may increase a thickness of the computing accessory 206 by less than about one-quarter of an inch (6.35 mm). Likewise, a support accessory 202 in the protective position may, according to some aspects of the present disclosure, add less than about one quarter of an inch (6.35 mm) to either or both of the height or width of the computing accessory 206. Such dimensions are, however, merely examples of some suitable dimensions. For instance, in other embodiments, a protective position of a support accessory 202 may add less than about an eighth of an inch (3.18 mm) to the thickness of the computing accessory 206 in any one or more dimensions. In still other embodiments, a dimension of the computing accessory 206 may be increased by more than about one-quarter of an inch. Further still, in some embodiments, the added thickness and/or width may be less than, or more than, any added dimension to a length of the computing accessory 206.

Figure 3A:
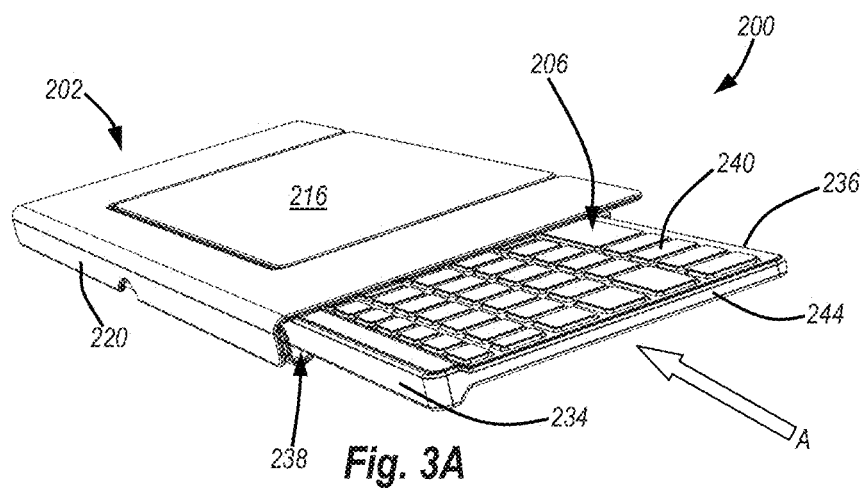
FIG. 3A is a top perspective view of a computing accessory and support accessory, the support accessory being in a protective configuration in accordance with one embodiment of the present disclosure.
Figure 3B:
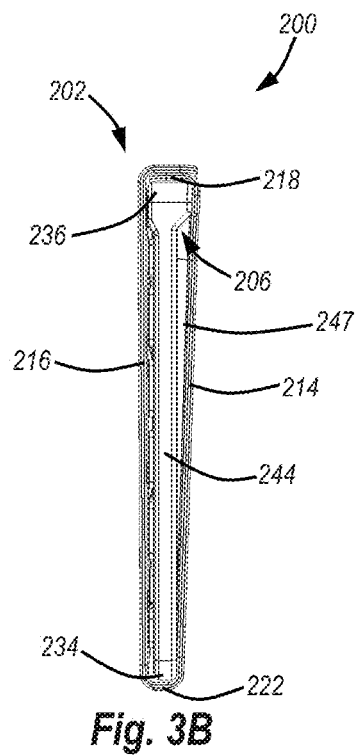
FIG. 3B and FIG. 3C are side views of the computing accessory and support accessory of FIG. 3A.
Figure 3C:
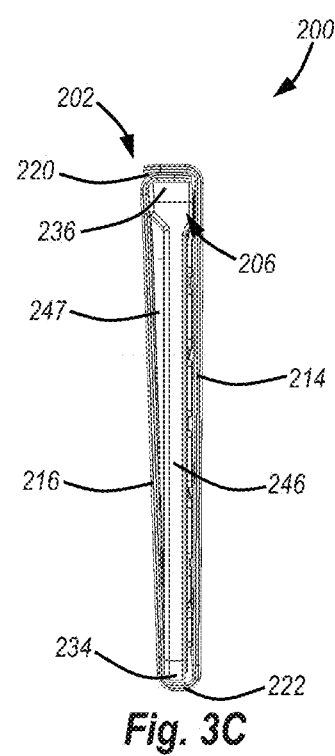
Figure 3D:
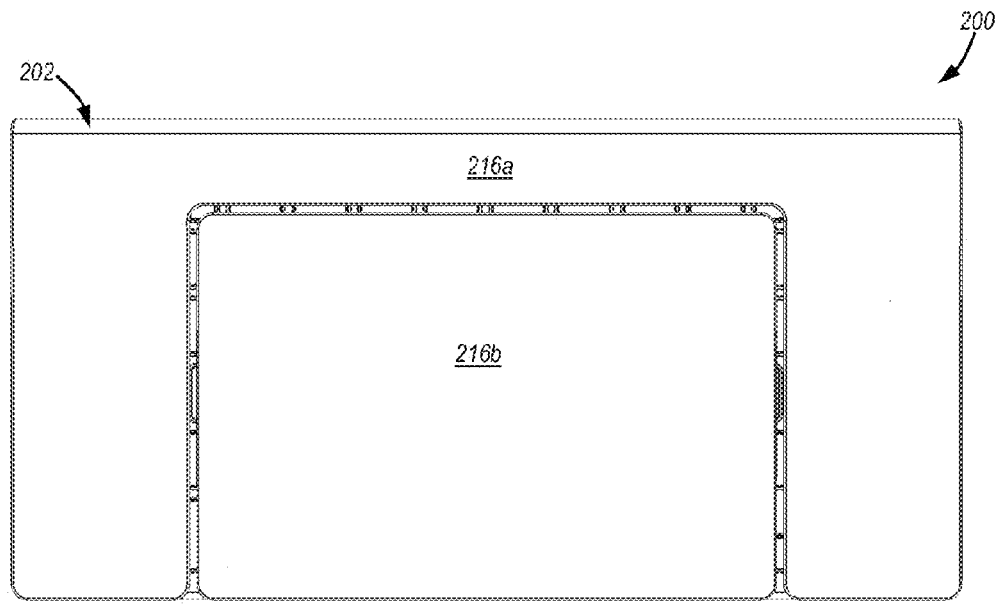
FIG. 3D is a top plan view of the computing accessory and support accessory of FIGS. 3A-3C.

As will be appreciated in view of the disclosure herein, the shape of the support accessory 202 while in the protective position may correspond generally to the shape of the computing accessory 206. More particularly, as best seen in FIGS. 3A-3C, the rear and front surfaces 234, 236 of the computing accessory 206 optionally have different dimensions such that the computing accessory 206 is not perfectly rectangular in at least one perspective. For instance, in the illustrated embodiment, the thickness of the computing accessory 206 at the rear surface 234 may be greater than the thickness at the front surface 236. In such an example embodiment, the support accessory 202 may have dimensions generally configured to correspond to the differing dimensions of the computing accessory 206. By way of illustration, FIGS. 3B and 3C illustrate an example protective configuration of the support accessory 202 as including a rear side defined by structures 218, 220, and a front side defined by the structure 222. The width of the structure 222 may be less than the individual or collective width of the structures 218, 220 so as to define a protective configuration that is wider at positions corresponding to rear surface 234 of the computing accessory 206 and thinner at portions corresponding to front surface 236 of the computing accessory 206.

In some embodiments, the variation in size at the front and rear surfaces 236, 234 of the support accessory 202 may be included as part of a support accessory 202 that, when in a protective configuration, has a generally wedge-shaped or trapezoidal cross-section. An example of such a support accessory 202 is shown in FIGS. 3B and 3C. With the wedge-shaped or trapezoidal configuration, the top and bottom structures 214, 216 may be non-parallel. The amount by which such structures 214, 216 are offset from parallel may vary based on the differences in dimensions between structures 218-222. In one embodiment, the offset from parallel may be between about 1° and about 30°, although the offset may be greater or smaller. In another embodiment, the offset is between about 1.5° and about 10°. In still another embodiment, the angle between structures 214, 216 may be between about 1° and about 5°. Optionally, the degree of offset between structures 214, 216 may generally correspond to an angular offset between surfaces of the computing accessory 206.

The general size of the computing accessory 206 may thus be substantially mirrored by the opening 238 defined by the support accessory 202. Further, the computing accessory 206 may vary in size and shape based on its use. In one example embodiment, the computing accessory 206 includes a keyboard 208 having a length of between about eight inches (203 mm) and about twelve inches (305 mm), and a width of between about three and a half inches (89 mm) and about six inches (152 mm). A thickness of the keyboard 208 may also vary. In one embodiment, a first side (e.g., a front side) of the keyboard 208 has a thickness between about one-eighth of an inch (3.2 mm) and about one half inch (12.7 mm) while a second side (e.g., a rear side) of the keyboard 208 has a thickness between about one quarter of an inch (6.4 mm) and about three quarters of an inch (19.1 mm). Such dimensions are presented by way of illustration only, and other dimensions may also be used. Regardless of the particular dimensions, the shape and size of the opening 238 optionally generally corresponds to the shape or size of at least a portion of the keyboard 208 or the computing accessory 206. The opening 238 may be sized to be about the same as or slightly larger than the keyboard 208 to allow the keyboard 208 to be placed within the opening 238 with relative ease. In another embodiment, the opening 238 may have one or more dimensions smaller than the keyboard 208. For instance, a smaller opening 238 may allow an interference fit to be created, particularly where portions of the support accessory 206 are flexible so as to stretch to accommodate the larger keyboard 208.

Figure 3E:
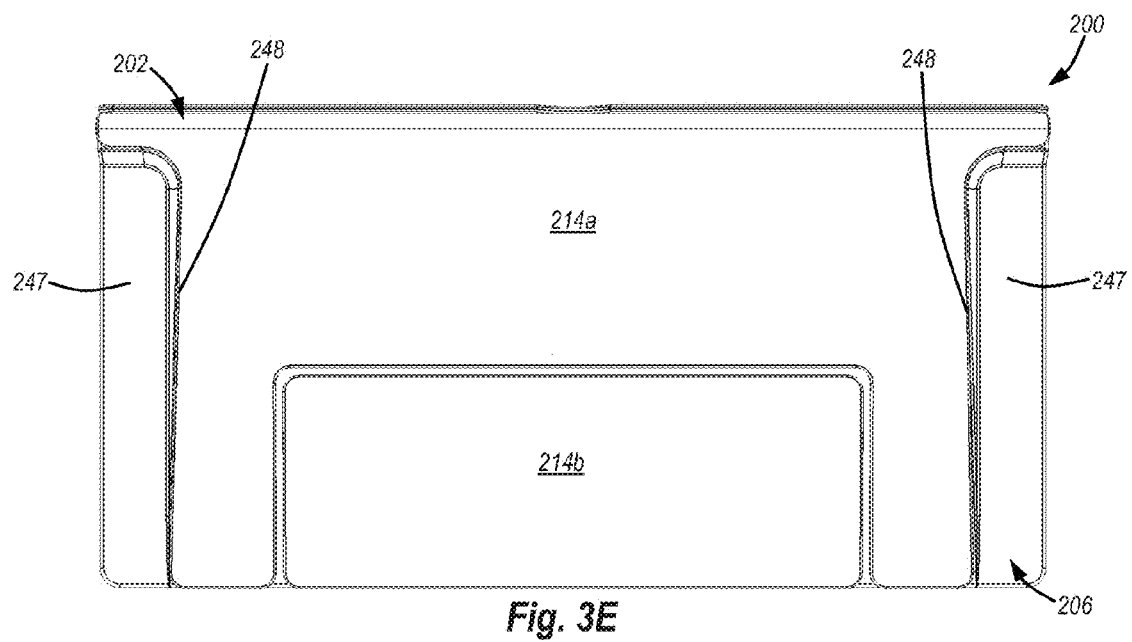
FIG. 3E is a bottom plan view of the computing accessory and support accessory of FIGS. 3A-3D.
Figure 3F:
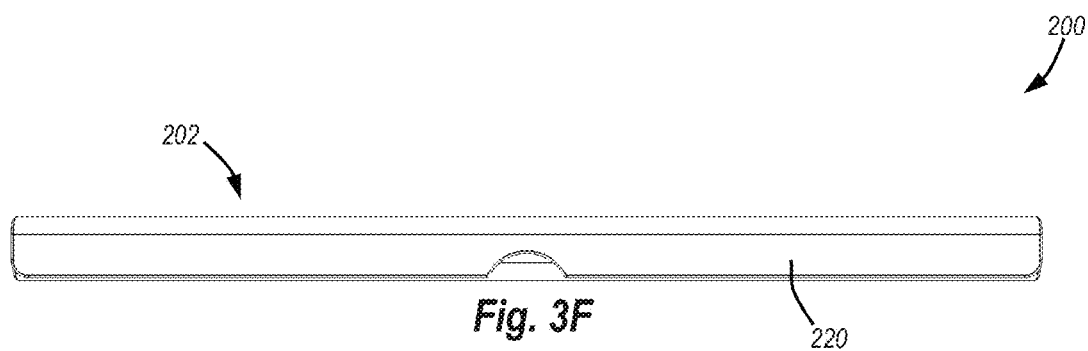
FIGS. 3F and 3G are front and rear views of the computing accessory and support accessory of FIGS. 3A-3E.
Figure 3G:
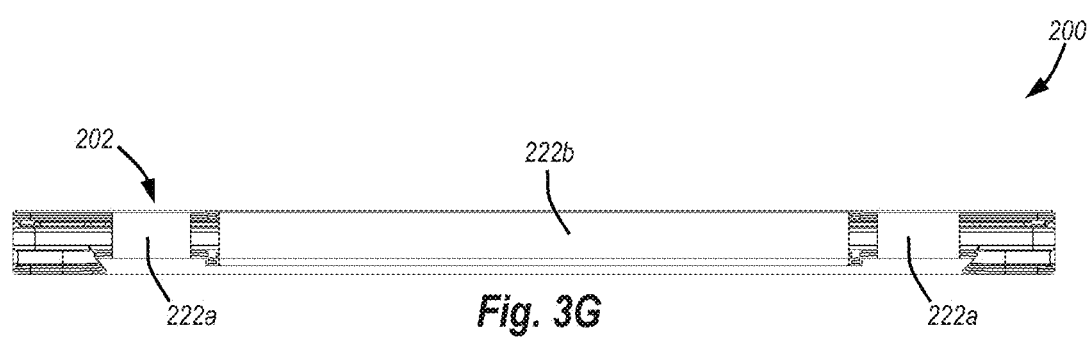

The support accessory 202 may also include other structures or configurations that correspond to elements of the computing accessory 206. For instance, in at least one embodiment, the computing accessory 206 may include handling or decorative features such as carve-outs 247. In this embodiment, carve-outs 247 are formed on opposing lateral sides of the computing accessory 206. Such carve-outs 247 may produce an elevated bottom surface along all or a portion of the lateral edges of the keyboard 208, which may allow a user to more easily slip his or her fingers thereunder to lift or manipulate the keyboard 208. Optionally, the carve-outs 247 are matched with corresponding recessed edges 248 in the support accessory 202. In FIG. 3E, for instance, the carve-outs 247 in the computing accessory 206 may generally align with corresponding recessed edges 248 in structure 214, although such need not be the case. In such an embodiment, the support accessory 202 may act as a cover that is in place on the computing accessory 206; however, one or more portions of the computing accessory 206 may remain exposed or accessible to allow the user to easily handle or otherwise manipulate the computing accessory 206 or the entire assembly. As will be appreciated in view of the disclosure herein, other components of the computing accessory 206 may also be matched with corresponding features of the support accessory 202. For instance, ports, openings, slots, wires, extensions, protrusions, other components, or any combination thereof, may be matched with corresponding structures of the support accessory 202.

The support accessory 202 may be formed from any one or more suitable materials. For instance, in at least one embodiment, components of the support accessory 202 may be wholly or partially formed of rigid or substantially rigid materials. Such materials may provide sufficient rigidity to protect the computing accessory for damage when dropped, or when another potentially damaging impact occurs. In some embodiments, the materials of the support accessory 202 may provide differing amounts of rigidity. By way of illustration, as described herein, the support accessory 202 may change between multiple arrangements, positions or configurations. To facilitate the changes, one or more components of the support accessory 202 may be moveable relative to other components of the support accessory 202. In other embodiments, a structure may include multiple sections of varying materials or properties.

As an example, the structures 214-220 are optionally formed wholly or partially of a rigid or substantially rigid material. According to one or more embodiments, the structure 222 may be flexible or may otherwise be configured to allow the structure 214 to move relative to structure 216. In at least one embodiment, the structure 222 is a flexible connector between the structures 214, 216. Optionally, other structures or components may also be flexible. For instance, a flexible connector may optionally be located between the structures 216, 220. In other embodiments, releasable clips or other components may be used to selectively disconnect portions of the support accessory 202 and allow movement of one or more of structures 214-222 relative to each other.

Where the structure 222 is a flexible connector or is otherwise configured to allow the structures 214, 216 to rotate or otherwise move relative to each other, a user may rotate structure 216 in one or more directions relative to structure 214. In some embodiments, a user may move structures 214, 216 in a manner that opens the support accessory 202 from a cover or protective position to allow the computing accessory 206 to be easily removed therefrom. Thus, the support accessory 202 may also be moved into an open position.

The support accessory 202 may also include additional or other materials. As an example, one embodiment contemplates the use of cushioning or insulative materials. Such materials may be placed on the interior and/or exterior surfaces of some or all of the structures 214-222. For instance, to cushion impacts of the computing accessory 206 while within the support accessory 202, cushioning material may line all or a portion of the structures 214-222 defining the periphery of the opening 238. Cushioning or other materials may also line the exterior surfaces so as to soften impact of the support accessory 202 against a portable electronic device or other devices.

Figure 4A:
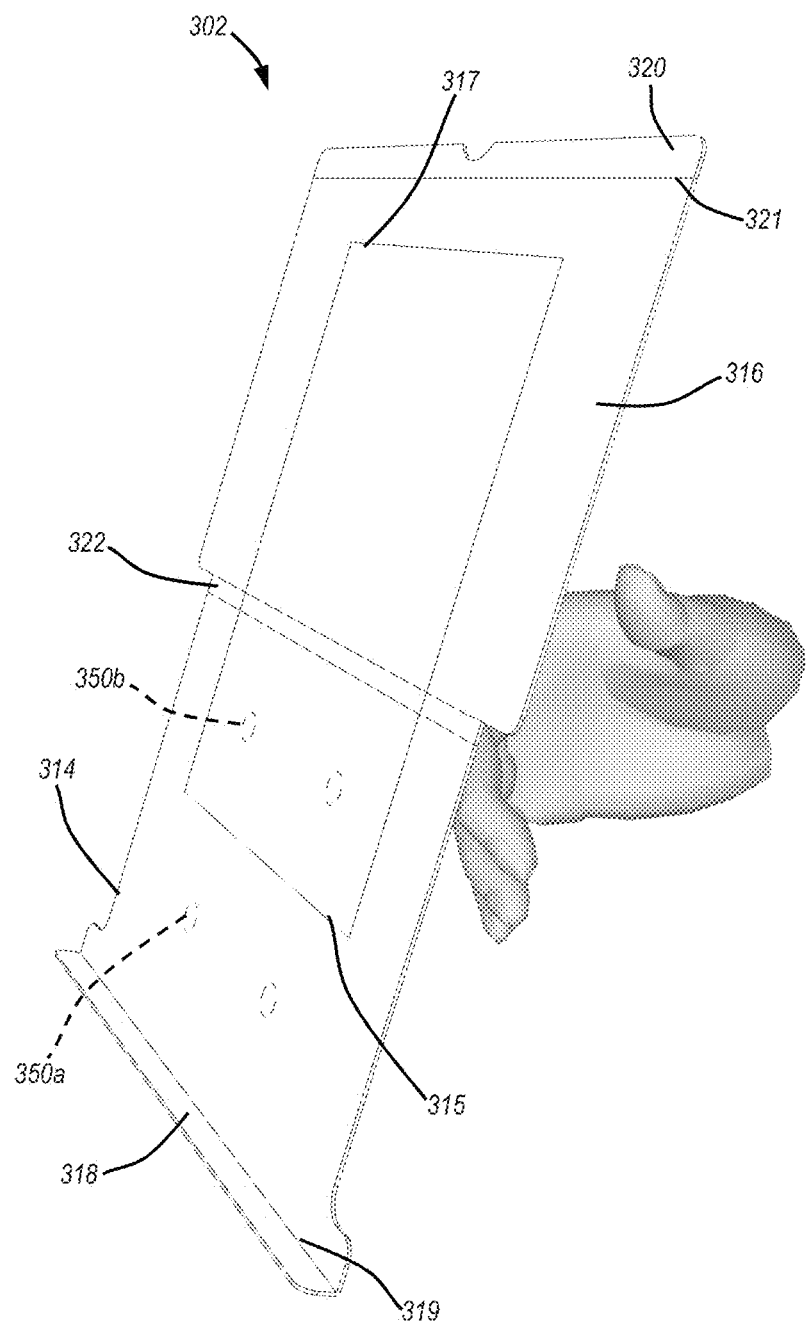
FIGS. 4A-4D illustrate an example method of transitioning a support accessory into a supportive configuration.

Turning now to FIG. 4A, an embodiment of an example support accessory 302 is illustrated in one example of an open configuration. In the illustrated configuration, the support accessory 302 is in a generally planar configuration. More particularly, although the illustrated embodiment is merely an example, the support structure 314 may be generally parallel and/or co-planar with support structures 316, 320 and optionally with a connector 322. The support structure 318 may also be rotated to be about co-planar with support structure 314; however, in the illustrated embodiment, the support structure 318 may connect to the support structure 314 at an interface 319, and at an angle that is generally fixed relative to the support structure 314.

FIGS. 4A-4D generally illustrate an example embodiment of a method for transitioning a support accessory 302 from an open configuration or position to a supportive configuration. In a supportive configuration, the support accessory 302 may be used to support a portable electronic device 104 (see FIGS. 1A-1G and FIG. 2). One aspect of the method of FIGS. 4A-4D is that the support accessory 302 may be transitioned between different positions in a simple, efficient, and intuitive manner. Indeed, as described herein, transitioning to specific, predetermined positions may be facilitated by one or more interconnected components so that a user can simply move one component to intuitively move all components to obtain the desired supportive configuration, even in the absence of instructions.

Figure 4B:
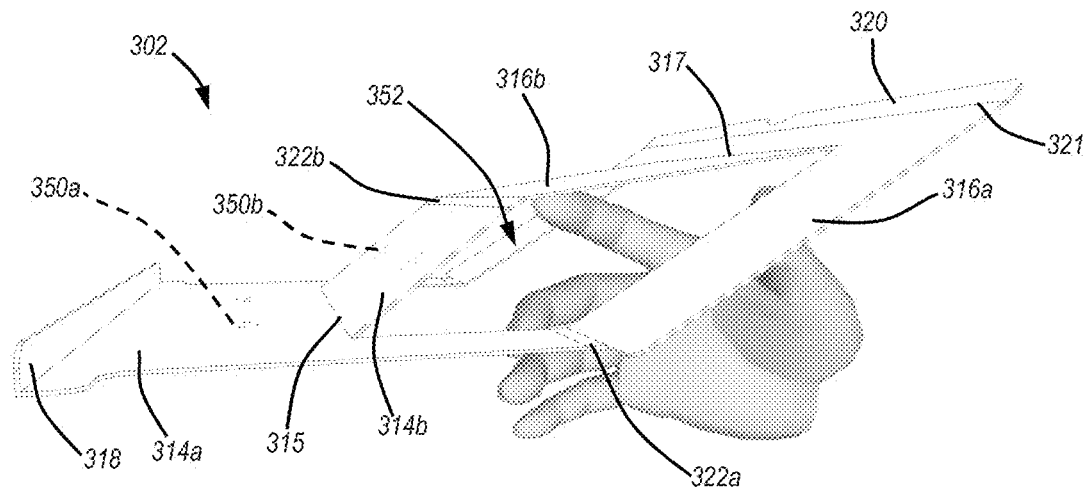

The support accessory 302 may include various structures that may be partitioned or otherwise separated into multiple sections. For instance, a first structure 314 may include both an exterior support structure 314a and an interior support structure 314b as shown in FIGS. 4A and 4B. Similarly, the second structure 316 may include both an exterior support structure 316a and an interior support structure 316b. The connector 322 may also be similarly or separable into exterior and interior connectors 322a, 322b. Moreover, although not illustrated, each of the structures 314a-316b may similarly be separated into multiple components (e.g., including separate rigid and non-rigid sections, sections of differing aesthetic or structural qualities, etc.).

To change the support accessory 302 from the open configuration illustrated in FIG. 4A to a desired supportive configuration (see, e.g., FIG. 4D), a user may begin by applying an inwardly directed force to an exterior surface of the support accessory 302. In FIGS. 4A and 4B, for instance, the force may be applied by a user's finger which contacts an exterior surface of the second interior support structure 316*b*.

According to one example embodiment, the first interior support structure 314*b* is connected to the first exterior device support structure 314*a* along an interface 315 that is on an opposite side of the first interior support structure 314*b* relative to the interior connector 322*b*. Similarly, the second interior support structure 316*b* may connect to the second exterior support structure 316*a* along an interface 317 that is on an opposite side of the second interior support structure 316*b* relative to the interior connector 322*b*. In FIGS. 4A and 4B, the interfaces 315, 317 are on opposite sides of the connector 322*b*, and about parallel to each other and the connector 322*b*, although other positions and arrangements may be provided.

Figure 4C:
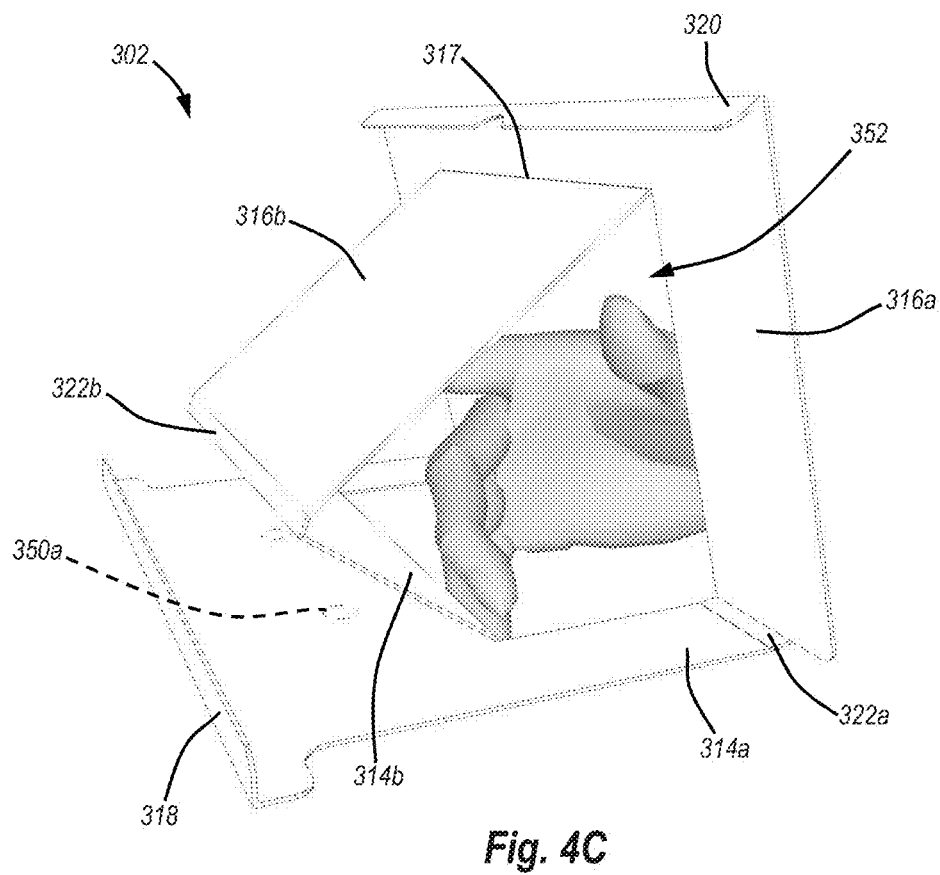

The interfaces 315, 317 of the illustrated embodiment may provide a connection between an interior section (comprising structures 314*b*, 316*b*, and 322*b*) and an exterior section (comprising structures 314*a*, 316*a* and 322*a*). Optionally, along a full length of the lateral sides of the interior section, the interior structures 314*b*, 316*b*, 322*b* may be detached from the adjacent portion of the exterior section. As a result, when an inwardly directed force is applied to the support accessory 302 in the manner shown in FIGS. 4A and 4B, the interior structures 314*b*, 316*b*, 322*b* may collectively move out of, and define, an opening 352 that is best seen in FIGS. 4B and 4C. More particularly, the first interior support structure 314*b* may rotate or otherwise move relative to the first exterior support structure 314*a* as the second interior support structure 316*b* rotates or otherwise moves relative to the second exterior support structure 316*a*. The connections between the first and second interior structures 314*b*, 316*b* (e.g., connector 322*b*) may act as linkages so that movement of a single one of the first and second interior structures 314*b*, 316*b* may also cause the other to move.

As the interior support structures 314*b*, 316*b* move to define the opening 352, they optionally become non-coplanar. In FIG. 4B, for instance, the first and second interior support structures 314*b*, 316*b* may be moved to a position in which an obtuse angle is formed therebetween. In some embodiments, the connections along interfaces 315 and 317 may also coordinate further movement of portions of the support accessory 302. For instance, by moving the interior structures 314*b*, 316*b*, 322*b* in the illustrated manner, the first and second exterior support structures 314*a*, 316*b* may also rotate or otherwise move relative to each other. Such rotation may also be facilitated by the exterior connector 322*a*. The connector 322*a* may be flexible or otherwise configured to allow such movement between the first and second exterior support structures 314*a*, 316*a*. As shown in FIG. 4B, the first and second exterior support structures 314*a*, 316*b* may move such that an obtuse angle is defined therebetween. As further shown in FIG. 4B, the interior connector 322*b* between interior structures 314*b*, 316*b* may move out of a generally co-planar relationship with the exterior connector 322*a* between exterior support structures 314*a*, 316*b*.

The various interfaces 315, 317 and connectors 322 may provide for collective movement of all or substantially all of the support accessory 302. For instance, as movement of a single component (e.g., second interior support structure 314*b*) is initiated, other components (e.g., first and second exterior support structures 314*a*, 316*a* and first interior support structure 316*a*) may automatically and intuitively move towards a supportive configuration. In one embodiment, as such intuitive movement occurs, the angle between the first interior support structure 314*b* and the first exterior support structure 314*a* may gradually decrease while an angle between the second interior support structure 316*b* and an upper edge of the second exterior support structure 316*a* may also gradually decrease. In some embodiments, and as best viewed in FIG. 4B, the first and second device structures 314, 316 may define a four-sided, generally kite-shaped structure when initially moved towards a supportive configuration.

As shown in FIG. 4C, a user may continue to apply a force to the support accessory 302, which can cause the angle between the first and second interior structures 314*b*, 316*b*, to further decrease at the interior connector 322*b*. At the same time, the angle between the first and second exterior support structures 314*a*, 316*a* may also decrease about the exterior connector 322*a*. As such movement occurs, a shape defined by the first and second support structures 314, 316 may generally transition from a narrow kite-shape to a wider kite-shape as shown in FIG. 4C, with the vertexes of the kite being at the interfaces 315, 317 and the connectors 322*a*, 322*b*.

As also apparent from the embodiments in FIGS. 4A-4C, as a force continues to be applied to transition the support accessory 302 to a supportive configuration, the first and second interior support structures 314*b*, 316*b* may move in a manner opposed to that of the first and second exterior support structures 314*a*, 316*a*. More particularly, the second interior support structure 316*b* may be caused to rotate about interior connector 322*b* in a clockwise direction relative to the first interior support structure 314*b*. In contrast, the second exterior support structure 316*a* may be caused to rotate about the exterior connector 322*a* in a counter-clockwise direction relative to the first exterior support structure 314*a*.

Figure 4D:
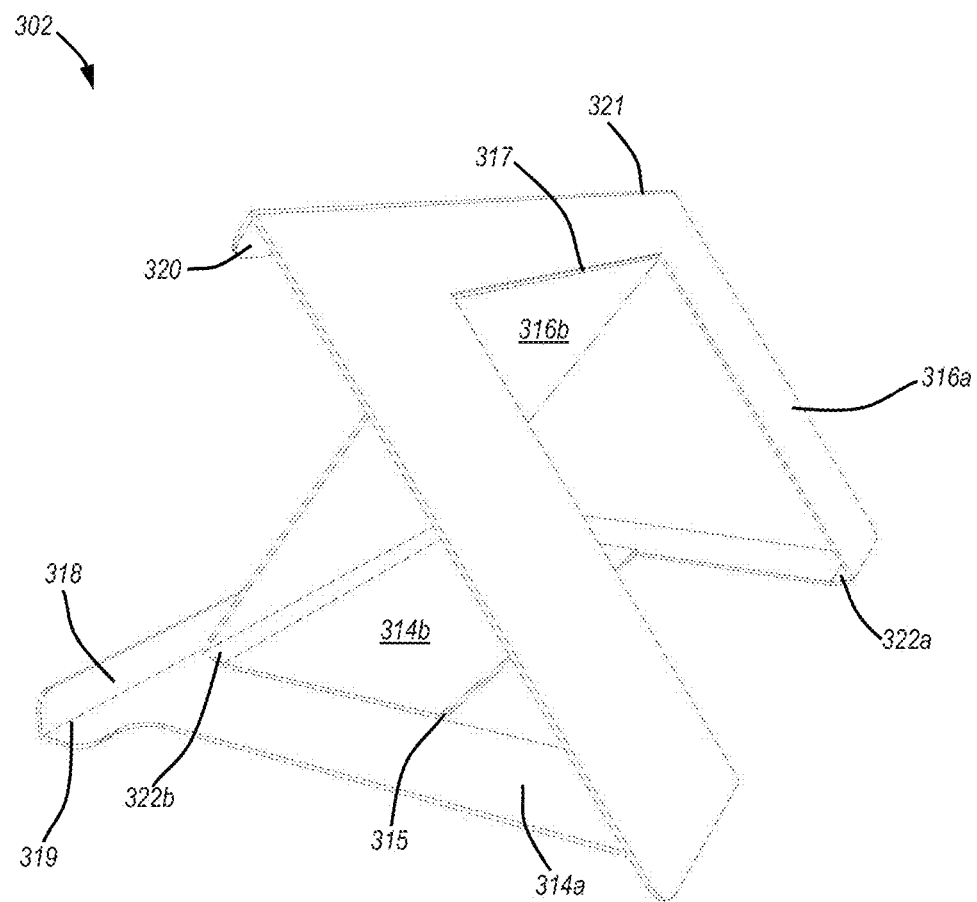

Ultimately, an applied force may cause the first interior support structure 314*b* to rotate about one-hundred eighty degrees on the interface 315. Upon completing such rotation, the first interior support structure 314*b* may come to rest on or near the first exterior support structure 314*a*, and be about parallel thereto, as shown in FIG. 4D. When such engagement occurs, the first and second support structures 314, 316 optionally collectively define a generally triangular-shaped structure as described herein relative to FIGS. 1A-1G, although such configuration is merely one example structure consistent with the principles presented herein.

The fourth device support structure 320 may also optionally be moved to an engagement position. In such an embodiment, the fourth device support structure 320 may be moved before, after or during movement of the interior structures 314*b*. More particularly, as shown in FIGS. 4A-4D, the fourth device support structure 320 is optionally rotated or otherwise moved from a position that is about co-planar with the second interior support structure 316*a*. In the illustrated embodiment, for instance, the fourth device support structure 320 is rotated about a flexible interface 321. The degree of rotation may vary, and the fourth device support structure 320 may be positioned in a manner that ultimately defines an acute, right, or obtuse angle relative to the second exterior support structure 316*a*. In some embodiments, as discussed herein, the third device support structure 318 may also be rotated; however, the third device support structure 318 may also be fixed at an angle relative to the first exterior support structure 314*a*. In any such embodiment, the third device support structure 318 may act as a lip against which a portable electronic device can be placed to maintain the electronic device in an upright, working position.

The foregoing example embodiment demonstrates one manner in which a support accessory 302 may be efficiently and intuitively changed between one or more positions. More particularly, by applying a force to the support accessory 302, the support accessory 302 may intuitively transition to a sustainable, equilibrium position (see FIG. 4D) in which a portable electronic device may be supported in an upright position.

Moreover, the efficiency by which such transformation occurs should be apparent to one skilled in the art in view of the disclosure herein. For instance, as described herein, multiple components may each move from a first position towards a second, desired position. In accordance with one embodiment, the multiple components move to their respective new positions, and do so automatically due to a kinetic relationship in which the components are interconnected. As a result, when a single component moves (e.g., by rotating the first interior support structure 314b in a counter-clockwise direction relative to the first exterior device support structure 314a), all or substantially all of the other components may at the same time move into the desired position. Consequently, although transitioning to a supportive position may involve movement of multiple components, such movement non-essentially occurs collectively and automatically with movement of a single component. Indeed, movement of a single element towards a supportive configuration optionally forces or guides other components into place in a supportive configuration.

According to some embodiments, one or more additional components may also be provided to facilitate transitioning of the support accessory 302 into a supportive position and/or maintenance of the support accessory 302 in a supportive position. By way of example, FIGS. 4A-4C illustrate various retention devices 350a and 350b. In particular, a first set of one or more retention devices 350a may be connected to, formed within, or otherwise disposed relative to the first exterior support structure 314a, which in this embodiment is a base support panel. A corresponding set of one or more retention devices 350b may be connected to, formed within, or otherwise disposed relative to the first interior support structure 314b. As the first interior support structure 314b is rotated toward, and optionally overlaps, the first exterior support structure 314a forming the base of support accessory 302 in the supportive position, the retention devices 350 and 350b may engage. In one embodiment, the retention devices 350 are magnetic and aligned or otherwise configured to attach using an attractive force therebetween. As a result, when the retention devices 350a and 350b are engaged, a magnetic biasing force is generated to resist moving out of the supportive position by resisting movement of the first interior support structure 314b away from the first exterior support structure 314a. In some embodiments, the biasing force may activate as the support accessory 302 is transitioned to the supportive position, such that the retention devices 350a actually ease a transition into the supportive position.

The retention devices 350a and 350b may be replaced by or supplemented with other devices other than magnetic devices. For instance, clasps, clips, slots-and-tabs, snaps, or other mechanisms to at least temporarily secure the support accessory 302 in a desired orientation may be used. In some embodiments, the retention devices selectively and/or releasably secure the support accessory 302 in a desired configuration (e.g., a supportive configuration), while in other embodiments a retention element 350a, 350b may provide a more permanent connection.

The support accessory 302 may also be selectively transitioned out of the supportive configuration. For instance, when the support accessory 302 is in the supportive configuration, a force can be applied to cause the first interior support structure 314b to move in an opposing direction (e.g., to rotate clockwise), and optionally overcoming a present biasing retention force. The support accessory 302 may then move out of the supportive position of FIG. 4D, and toward the open position of FIG. 4A.

As also discussed herein, the support accessory 302 may be used as a protective device in some embodiments. According to at least some aspects, the support accessory 302 may thus be selectively transitioned from a supportive configuration to a protective configuration, and vice versa. Optionally, the support accessory 302 may move through an open configuration (see FIG. 4A) while moving between supportive and protective configurations. FIGS. 5A-5D illustrate one example embodiment for transitioning a support accessory 402 from an open configuration to a protective configuration and using the support accessory 402 to protect a computing accessory 406.

More particularly, FIG. 5A illustrates an embodiment in which a support accessory 402 is in an open configuration. In some embodiments, the support accessory 402 may be received in an open configuration, or may be moved to an open position from a supportive configuration (e.g., by reversing the method of FIGS. 4A-4D). In an open configuration, the user may manipulate the support accessory 402, which in this embodiment is shown to include two hands grasping first and second support structures 414, 416 of the support accessory 402. In other embodiments, a user may grasp other portions of the support accessory 402, or even use a single hand or no hands to transition the support accessory 402 to the protective position.

Turning now to FIG. 5B, a user may use his or her hands to apply forces that cause the first and second support structures 414, 416 to rotate about an interface 422, which may be flexible connector in some embodiments. In the illustrated embodiment, the second support structure 416 may rotate around the interface 422 to decrease the angle between the first and second support structures 414, 416. The first support structure 414 of the illustrated embodiment is also shown as being attached to a third support structure 418 which is, in this embodiment, fixed at about a right angle relative to the first support structure 414, but may be connected at a flexible interface allowing rotation of the third support structure 418 relative to the first support structure 414. The second support structure 416 is optionally attached to a fourth support structure 420 which may be about co-planar relative to the second support structure 416, or may be angled with respect thereto. In some embodiments, a flexible interface 421 may connect the fourth support structure 420 to the second support structure 416; however, in other embodiments, an interface may create a rigid or removable connection forming an angularly offset or a co-planar arrangement.

The first and second support structures 414, 416 may be structured such that as the user continues to apply the forces that draw the first and second structures 414, 416 together, the third support structure 418 may engage the second support structure 416, the flexible interface 421, the fourth support structure 420, or any combination of the foregoing, or the fourth support structure 420 may engage the first support structure 414. In accordance with at least one embodiment the fourth support structure 420 may rotate about the flexible interface 421, optionally at about the time the third support structure 418 engages the second support structure 416 or the flexible interface 421. Such rotation may cause the fourth support structure 420 to fully or partially overlap the third support structure 418. FIG. 5C illustrates one example embodiment in which such an overlap has occurred and the fourth support structure 420 is exterior to the third support structure 418, although the third support structure 418 may alternatively be exterior to the fourth support structure 420.

Upon folding or otherwise transforming the support accessory 402 to a protective configuration as shown in FIG. 5C, an opening 428 may be defined at the interior of the support accessory 402. The opening 428 may be of a predetermined size, shape, or other configuration. In one embodiment such predetermined configuration corresponds to the size, shape, or other configuration of a particular computing accessory. In some embodiments, multiple computing accessories of different types may have the same general configuration to allow the support accessory 402 to be used interchangeably with any number of different types of computing accessories.

In accordance with one embodiment, and as shown in FIG. 5D, a computing accessory 406 may be inserted into the opening 428 and moved relative to the support accessory 402 so as to be inserted within the support accessory 402. For instance, the computing accessory 406 may be moved in the direction of the arrow B to be slid into an opening, channel, chamber or other area defined by the support accessory 402. While the illustrated embodiment generally illustrates a support accessory 402 configured to enclose a computing accessory 406 of a similar size, such embodiment is merely one example. In other embodiments, the support accessory 402 may cover only a portion (e.g., a single surface) of the computing accessory 406, or may even be larger so as to allow multiple computing accessories to be covered or protected thereby. Furthermore, rather than sliding the computing accessory 406 into place after placing the support accessory 402 in the protective configuration, the support accessory 402 may be placed against the computing accessory 406 and then folded or otherwise transitioned into the protective configuration.

While FIG. 5D illustrates an example of sliding a computing accessory 406 into the support accessory 402 that is in a protective configuration, other devices or systems may be protected by the computing accessory 406. For instance, rather than protecting a computing accessory 406, the support accessory 402 may be sized, shaped or otherwise configured to receive and protect a portable electronic device (e.g., a tablet, smart phone, multimedia player, etc.).

In accordance with some embodiments, and as shown in FIG. 5D, the support accessory 402 may include one or more retention devices 450, 452. Once the computing accessory 406 is being protected by the support accessory 402, the user may not want the computing accessory 406 to inadvertently fall out of, or otherwise be displaced from the support accessory 402. In at least one embodiment, the support accessory 402 may include one or more retention devices 450*a* that mate with corresponding retention devices 450*b* of the computing accessory 406. The retention devices 450*a*, 450*b* may include, for instance, magnets that are arranged to create an attraction therebetween and selectively secure the computing accessory 406 to the support accessory 402. Such retention devices 450*a*, 450*b* may be placed in any suitable location. For instance, retention devices 450*a* may be placed in any of the support structures 414-420, while corresponding retention devices 450*b* may be placed in a corresponding location on the computing accessory 406.

In another embodiment, one or more additional retention devices 452 may be used to maintain the support accessory 402 in a closed position. For instance, magnets or another device may be positioned in third and/or fourth support structures 418, 420. When the third and fourth support structures 418, 420 overlap, the retention devices 452 may engage and selectively secure the third and fourth support structures 418, 420 in the desired position. As will also be appreciated in view of the disclosure herein, the retention devices 450, 452 may include magnets or other devices or components. For instance, the retention devices 450, 452 may include clasps, clips, latches, snaps, other components, or any combination thereof. Moreover, in still other embodiments, any or all of the retention devices 450, 452 may further act as attachment, retention or stabilization structures to facilitate maintaining the support accessory 402 in a supportive position for supporting a portable electronic device (see FIG. 4B).

As will be appreciated in view of the disclosure herein, any of the other various components of the support accessory 402 may also be varied as desired. For instance, modifications may be made to the support structures 414-420, including to the shapes, sizes, relative dimensions, other components, or any combination of the foregoing. As one example, while the illustrated embodiment depicts a semi-circular slot 454 in the fourth support structure 420, such semi-circular slot 454 is merely an example feature. The semi-circular slot 454 may allow a user to easily grasp and unfold the fourth support structure 420 from a position overlapping the third support structure 418, and to transition the support accessory 402 out of the protective position. In other embodiment, different slots, tabs, bumps, recesses, other features, or any combination of the foregoing, may be used, or additional handling devices may be eliminated entirely. Any other components of the support accessory 402 may also have any suitable modification made thereto.

The methods and processes described relative to FIGS. 5A-5D may also be wholly or partially reversed, or combined with any number of actions. For instance, in one example method, a user may remove a computing accessory 406 (e.g., by moving the computing accessory 406 in a direction opposite that of arrow B) and/or unfold or otherwise open or transition the support accessory 402 to an open configuration, or to a supportive configuration where the support accessory 402 may be used to support a portable electronic device in an upright position. More particularly, relative to FIG. 5C, a user may unfold the support accessory 402 by, for instance, rotating the second support structure 416 about the interface 422 and relative to the first support structure 414. As such rotation continues the support accessory 402 may transition to one or more open positions such as those illustrated in FIGS. 5A and 5B. Before, during, or after the transition of the support accessory 402 between positions, the computing accessory 406 may be removed relative to the support accessory 402.

From an open position, the support accessory 402 is optionally transitioned to a supportive configuration. For instance, a process similar to that illustrated in FIGS. 4A-4D may be followed to fold or otherwise manipulate the support accessory 402 into a supportive configuration. Once the support accessory 402 is in a suitable supportive configuration, a portable electronic device may be positioned in a manner to be supported thereby (see FIGS. 1A-1C).

A support accessory according to some embodiments of the present disclosure may be manufactured using techniques known in the art in view of the disclosure herein. For instance, in some embodiments, a support accessory may be formed of substantially a single material, and then bent, cut, perforated, or the like. In other embodiments, various materials may be used, each having differing properties. For instance, support structures of a support accessory may be wholly or partially formed of substantially rigid materials so as to enable the support accessory 402 to support a portable electronic device in an upright or working position. Such materials may include metals, alloys, polymers, composites, organic materials, or any other material that can provide the desired supportive forces. In some embodiments, portions of the support accessory are flexible. Flexible materials may be used within a particular component (e.g., between rigid portions of a support structure), in connectors, at interfaces, or in other locations or components.

In one embodiment, selectively rigid and flexible structures may be formed using a layered manufacturing technique. For instance, substantially rigid materials forming support structures may be covered by a fabric, flexible polymer, or other flexible material. At locations where the substantially rigid materials are located, the support accessory may remain rigid, while at other locations (e.g., locations between rigid materials) the support accessory may be flexible. In some embodiments, the rigid or substantially rigid materials may be sandwiched between flexible materials. Consequently, the rigid material may provide rigidity at structural sections, while the flexible material may provide allow flexure at connective or other sections. Further still, certain components (e.g., first support structure 414, second support structure 416, interface 422) are optionally formed as an integral component, and subsequently cut, perforated or otherwise partitioned to define various sections thereof. For instance, the first support structure 414 may be formed as a single component and lateral cuts may be used to define a separation between any interior and exterior portions thereof.

The particular components of the support accessory 402 may be formed in any number of other manners, and may also be produced to have any number of different structural configurations, sizes, shapes, other configurations, or any combination of the foregoing. For instance, in FIGS. 5A-5C, the first and second support structures 414, 416 are shown as including interior portions formed as generally rectangular panels. Such shapes are merely illustrative, however, and the interior portions may be triangular, trapezoidal, square, rhomboidal, or have any number of other regular or irregular shapes. Further, while the illustrated embodiment depicts the interior portion of the first support structure 414 as being smaller in one or more dimensions relative to the interior portion of the second support structure 416, such embodiment is merely illustrative.

The interior portions of the first and second support structures 414, 416 may also vary in their construction, configuration, size and shape. In the illustrated embodiment, each of the first and second support structures 414, 416 has an exterior portion forming a generally "U" or "C" shaped construction around the corresponding interior portion. In other embodiments, however, other configurations may be utilized. For instance, in one embodiment, one or more of the first and second support structures 414, 416 may have an "L" or "T" shaped construction, although still other embodiments may be utilized. Other illustrated aspects of the first and second support structures 414, 416 are also merely illustrative, including the relative dimensions of such components.

Systems, apparatus, assemblies, methods and constructions presented herein, or which may be understood by a person having ordinary skill in the art upon a review of the disclosure herein, are presented by way of example and not limitation. Accordingly, no element illustrated or described should be considered to be essential unless so recited in the appended claims. Moreover, unless a method, step or act is recited as being required to be performed prior to another method, step or act, no particular order should be required. For instance, while the discussion of FIGS. 5A-5D describes folding or otherwise positioning the support accessory 402 in a protective configuration and thereafter positioning the computing accessory 406, in other embodiments the computing accessory 406 may be positioned relative to the support accessory 402 prior to all or a portion of a method for transitioning the support accessory 402 to the protective configuration.

Thus, although the foregoing description contains many specifics, these should not be construed as limiting the scope of the disclosure or of any of the appended claims, but merely as providing information pertinent to some specific embodiments that may fall within the scopes of the disclosure and the appended claims. Features from different embodiments may be employed in combination. In addition, other embodiments of the present disclosure may also be devised which lie within the scopes of the disclosure and the appended claims. The scope of the present disclosure is, therefore, indicated and limited only by the appended claims and their legal equivalents. All additions, deletions and modifications to example embodiments, as disclosed herein, that fall within the meaning and scopes of the claims, are to be embraced by the claims.

What is claimed is:

1. A multi-functional support accessory for a computing system, comprising:
    a plurality of interconnected support structures, including:
        a first support element;
        a second support element hingedly associated with the first support element;
        a third support element associated with an edge of the second support element; and
        a fourth support element associated with an edge of the first support element;
    wherein the plurality of interconnected support structures are selectively moveable to define at least:
        a supportive configuration for supporting a portable electronic device of the computing system in an at least partially upright orientation to orient a display of the portable electronic device in an at least partially upright position while a separate computing accessory of the computing system is being used with the portable electronic device; and
        a protective configuration for protecting at least a portion of the computing accessory, without protecting the portable electronic device, wherein, in the protective configuration:
            the first support element covers a top surface of the computing accessory;
            the second support element covers a bottom surface of the computing accessory;
            the third support element covers a side surface of the computing accessory; and
            the fourth support element is superimposed with the third support element.

2. The multi-functional support accessory of claim 1, wherein in the protective configuration the plurality of interconnected support structures form a protective cover of a size and shape corresponding to the computing accessory.

3. The multi-functional support accessory of claim 1, wherein the computing accessory includes a keyboard.

4. The multi-functional support accessory of claim 1, wherein the plurality of interconnected support structures define at least one support wedge while in the supportive configuration.

5. The multi-functional support accessory of claim 4, wherein a rear support wedge has an opening therein, and wherein a frontal support wedge has a location corresponding to the opening in the rear support wedge.

6. The multi-functional support accessory of claim 5, wherein the rear and frontal support wedges open in opposite directions.

7. The multi-functional support accessory of claim 1, wherein the plurality of interconnected support structures include flexible connectors therebetween.

8. The multi-functional support accessory of claim 1, wherein at least two of the interconnected support structures are fixed at a predetermined angular offset.

9. The multi-functional support accessory of claim 1, wherein in the supportive configuration, interior and exterior portions of a first support structure are parallel, and interior and exterior portions of a second support structure are inclined relative to each other and the first support structure.

10. The multi-functional support accessory of claim 1, wherein:
   in the protective configuration, a first support structure has co-planar interior and exterior portions and a second support structure has co-planar interior and exterior portions; and
   in the supportive configuration, the first and second support structures each have angularly offset interior and exterior portions.

11. A computing and support accessory combination, comprising:
   a computing accessory comprising a standalone device configured to communicatively couple to a portable electronic device; and
   a support accessory having a plurality of equilibrium configurations, including at least:
      a protective configuration for protecting at least a portion of a top surface and a bottom surface and an entire first side and an entire second side of the computing accessory separately from the portable electronic device when the computing accessory is not being used with the portable electronic device; and
      a supportive configuration for supporting the portable electronic device in an at least partially upright position to orient a display of the portable electronic device in an at least partially upright position while the computing accessory is being used with the portable electronic device.

12. The computing and support accessory combination of claim 11, wherein the computing accessory includes a keyboard.

13. The computing and support accessory combination of claim 11, wherein the keyboard is wedge shaped.

14. A multi-functional support accessory for a portable electronic device, comprising:
   a first substantially rigid support element having a first exterior portion and a first interior portion, the first interior portion being flexibly connected to the first exterior portion, the first substantially rigid support element configured to be positioned in a protective arrangement over and to cover a top of a portable keyboard;
   a second substantially rigid support element having a second exterior portion and a second interior portion, the second interior portion being flexibly connected to the second exterior portion, the second substantially rigid support element configured to be positioned beneath a bottom of the portable keyboard;
   a connector at least partially disposed between the first and second substantially rigid support elements, the connector having a first connector portion between the first and second exterior portions, and a second connector portion between the first and second interior portions;
   a third substantially rigid support element connected to the second substantially rigid support element and opposite the connector, the third substantially rigid support element configured to be positioned over a side surface of the computing accessory; and
   a fourth substantially rigid support element connected to the first substantially rigid support element and opposite the connector, the fourth substantially rigid support element configured to overlap the third substantially rigid support element on the side surface of the computing accessory.

15. The multi-functional support accessory of claim 14, wherein the first interior portion is flexibly connected to the first exterior portion and the second connector along opposite longitudinal edges.

16. The multi-functional support accessory of claim 14, wherein the first interior portion is separated from the first exterior portion along a portion of at least one lateral edge.

17. The multi-functional support accessory of claim 14, wherein the second interior portion is flexibly connected to the second exterior portion and the second connector along opposite longitudinal edges.

18. The multi-functional support accessory of claim 14, wherein the second interior portion is separated from the second exterior portion along a portion of at least one lateral edge.

19. The multi-functional support accessory of claim 14, further comprising:
   at least one retention element for maintaining the first and second substantially rigid support elements in a supportive configuration or a protective configuration.

20. A method for supporting a portable electronic device in an upright position, comprising:
   removing a support accessory from a protective configuration over a portable keyboard to enable use of the portable keyboard with a separate portable electronic device, wherein the protective configuration is configured to protect a top surface, a bottom surface, an entire first side and an entire second side of the portable keyboard;
   transitioning the support accessory to a supportive configuration;
   placing the portable electronic device in an at least partially upright position on the support accessory while the support accessory is in the supportive configuration to orient a display of the portable electronic device in an at least partially upright position;
   supporting the portable keyboard at a location separate from a location of the support accessory and the portable electronic device; and
   using the portable keyboard while the support accessory is in the supportive position and the portable electronic device is in the at least partially upright position.

21. The method of claim 20, wherein removing the support accessory from the portable keyboard comprises separating a pair of panels of the support accessory from the portable keyboard and from one another.

22. The method of claim 20, wherein the portable keyboard is configured to be used with a plurality of different types of portable electronic devices.

23. The method of claim 20, wherein transitioning the support accessory to the supportive configuration includes:
   transitioning first and second panels of the support accessory from coplanar orientations to non-coplanar orientations.

24. The method of claim 20, wherein transitioning the support accessory to the supportive configuration includes:
   rotating a first interior support portion of a first panel of the support assembly in a first direction relative to a second interior support portion; and rotating a first exterior support portion of the first panel in a second direction relative to a second exterior support portion, the second direction being different from the first direction.

* * * * *